United States Patent [19]

Russ

[11] Patent Number: 5,577,212
[45] Date of Patent: Nov. 19, 1996

[54] METHOD FOR REPORTING FILE WRITE STATUS IN A SHARED FILE SYSTEM

[75] Inventor: Craig F. Russ, Berwyn, Pa.

[73] Assignee: Unisys Corporation, Blue Bell, Pa.

[21] Appl. No.: 353,487

[22] Filed: Dec. 9, 1994

[51] Int. Cl.$^6$ ........................................ G06F 13/00
[52] U.S. Cl. ................... 395/250; 395/872; 364/239; 364/239.7; 364/284.1
[58] Field of Search ........................ 395/250, 872

[56] References Cited

U.S. PATENT DOCUMENTS 4,442,487  4/1984  Fletcher et al. .................. 395/449

*Primary Examiner*—Krisna Lim

[57] ABSTRACT

A plurality of buffers is provided which are shared in that each are capable of having data written to or from them by one or more user computer programs. Each of those buffers is dedicated to reading data from or writing data to a unique particular area in a storage device such as physical disk media. A first set of registers is provided for monitoring the status of each of a number of data transfers between any one of the user programs and a particular such storage location. A second set of registers is provided for monitoring the status of reads from a storage location, or writes to a storage location, via a particular one of the buffers. This system thereby keeps each user program informed of any read or write commands it has issued, while permitting a number of reads or writes between different user programs, and a single storage area served by a single shared buffer, to be accomplished in one input/output operation.

13 Claims, 13 Drawing Sheets

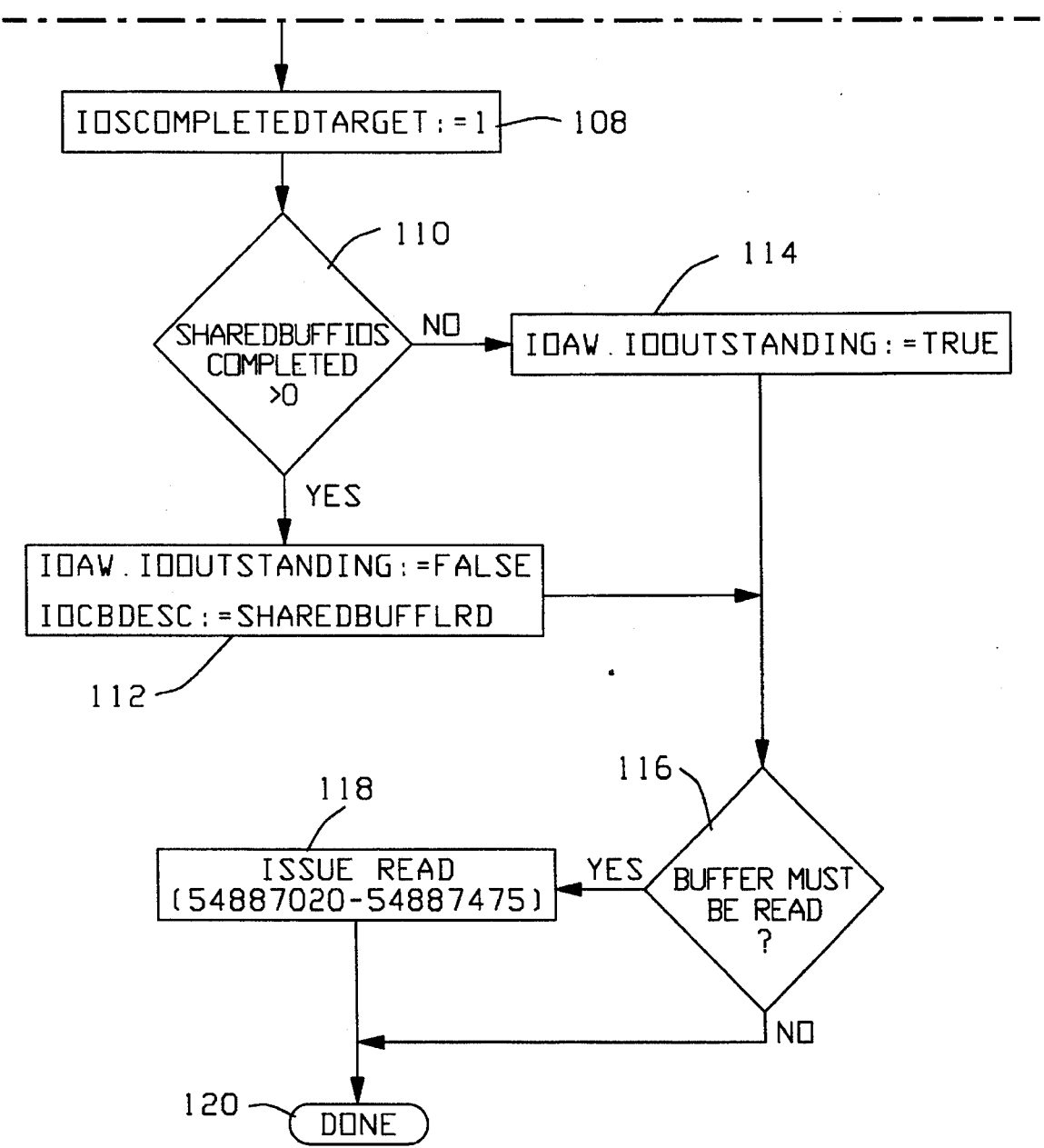
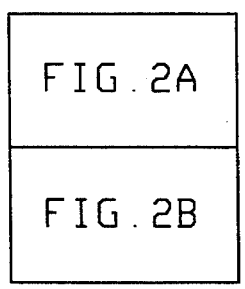
FIG. 2B
FIG. 2

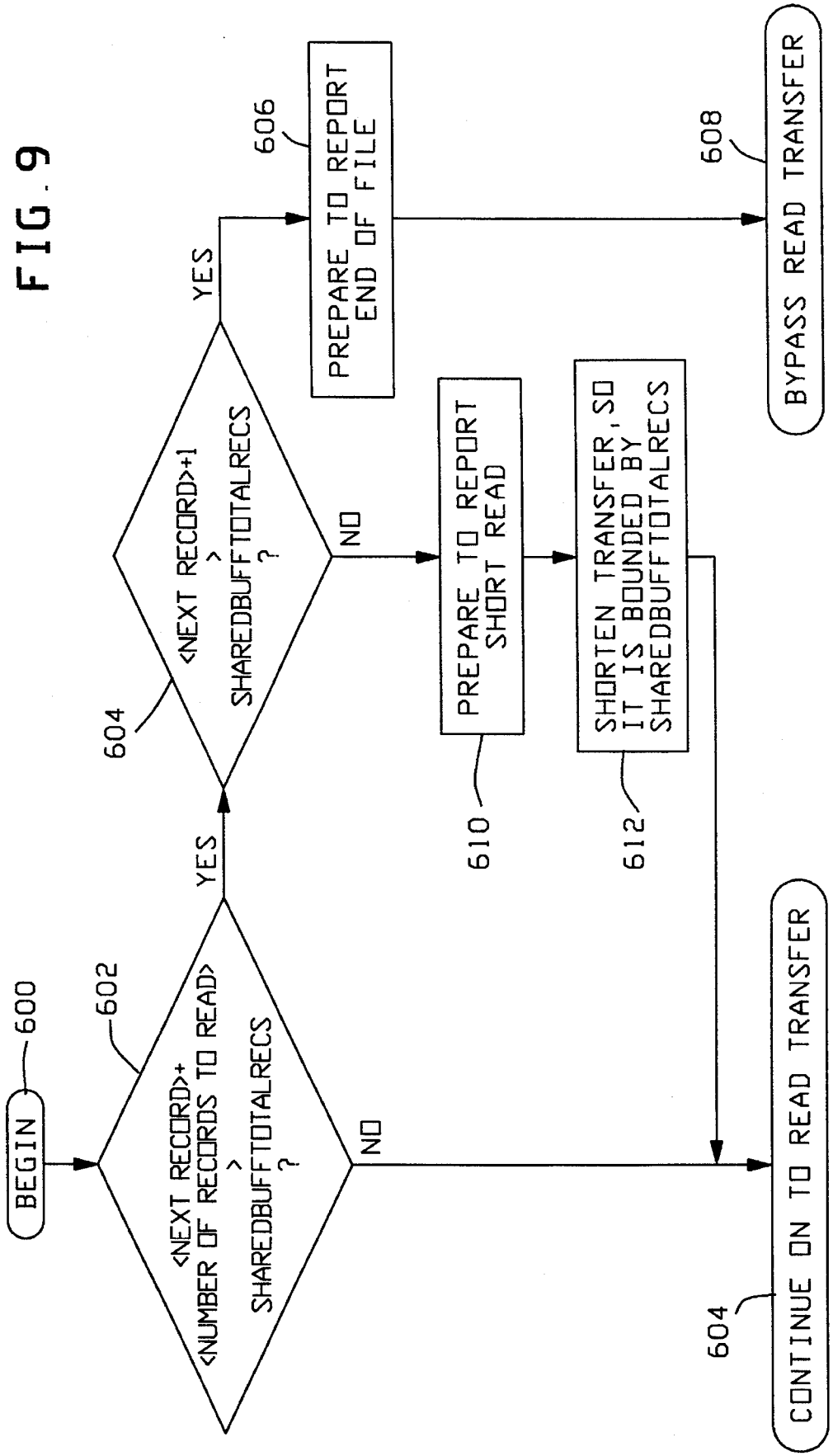

METHOD FOR REPORTING FILE WRITE STATUS IN A SHARED FILE SYSTEM

FIELD OF THE INVENTION

The present invention relates to apparatus and method for performing transfer, between a computer operating system and a peripheral device, of data in the form of files, and the management of such files. In particular, the apparatus and method apply to such transfers and management using shared buffers.

BACKGROUND OF THE INVENTION

Data is transferred between the main memory of a computer and an external or peripheral physical file, such as a hard disk or other storage device, through use of file information blocks (FIBs), also referred to as logical files. Each logical file has a file description which is basically a control point for logical operations against the file, and has its own copy of where in the file such an operation is taking place at any given time.

In reading data from or writing data to physical media, one approach has been to perform direct input/output between a computer and such media. In other words, no intermediate or intermediary buffers are used, but instead the user performs physical input/output operations directly from his arrays to the media; the user is then responsible for managing its own buffering. A second approach is where intermediary buffers were used that were private to each logical file. In other words, each buffer is permanently assigned to a physical location in memory. In this approach, if each of two programs has a buffer, then there is no coordination of physical reads and writes, so that until the content of one buffer is written onto physical media, other programs could not be aware of the change. Furthermore, even if the content of a buffer has been forced out to disk, if the content of any corresponding buffer in another program is then not discarded, then that program would see bad data at the buffer instead of the proper data at the disk. For this reason, a private buffer scheme is not a desirable approach where multiple programs or program modules want to share the same physical file. The direct I/O approach could be useable for that purpose, but required some other mechanism for synchronizing or coordinating writes to physical media so that each program or module would know when it had to discard its data and read same again from the media. Accordingly, there exist applications in which there is a need to have two or more separate programs or modules to share one physical file. For such purposes, sharing buffers is preferred. With shared buffers, each buffer services one location or set of locations in the storage device, but is shared with, and can be utilized by any of, multiple programs, users, modules, etc. However, problems have been encountered in that one user might write into a buffer, and then a second user might take some action requiring the buffer to be transferred to physical media. If that transfer failed, the data loss would not be reported to the user or program that originally provided to the shared buffer the data thereby lost. Such a user would accordingly assume that the content of that buffer had been written into the desired storage location, and the future operation of that user would be affected thereby. The present invention avoids this problem.

SUMMARY OF THE INVENTION

Accordingly, an object of the present invention is to provide apparatus and method for transfer of data between one or more storage locations and a plurality of users.

Another object of the present invention is to provide apparatus and method for sharing otherwise dedicated buffers among a plurality of users.

A further object of the present invention is to provide apparatus and method for controlling access to shared buffers.

Still another object of the present invention is to provide apparatus and method for notifying a user as to whether a data transfer operation requested by that user has been accomplished.

A still further object of the present invention is to provide apparatus and method for providing error notification to a logical file so that the job that issued a write command knows that this operation was not accomplished.

Yet another object of the present invention is to provide apparatus and method for providing parallelism in the handling of multiple I/O commands, in that multiple input/output operations can take place between multiple stacks and multiple logical files at the same time.

Still another object of the present invention is to provide apparatus and method for efficiently implementing shared buffers that also efficiently informs a user providing data to a buffer if that data is not successfully written from that buffer.

Briefly, these and other objects of the present invention are accomplished by a pool of shared buffers wherein each buffer is dedicated to one or more storage location(s) but is shared among a plurality of logical files or file information blocks. A separate descriptor is provided for each file which identifies each buffer that that file is currently using. This linkage is not severed until any writes necessitated by modifications to the buffer via that logical file have been issued and completed, and any errors have been reported. If an attempt to write data via a shared buffer to a storage location such as in magnetic media incurs an error, then that error is reported back to the originator of that data (e.g. a computer program) to provide notification that the data did not get written to the desired storage location. In a shared buffer space, many logical files could write into that space before their data is written physically to the respective desired storage locations; a single physical write step will suffice to so transfer that data to the desired locations. The invention is thereby able to do a minimal number of physical writes while still reporting the writes and any errors to the originators of the respective data.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 9 is a flowchart showing another portion of a process, according to one embodiment of the present invention, for controlling operation of the apparatus of FIG. 1.

DESCRIPTION OF THE PREFERRED EMBODIMENT

Figure 1:
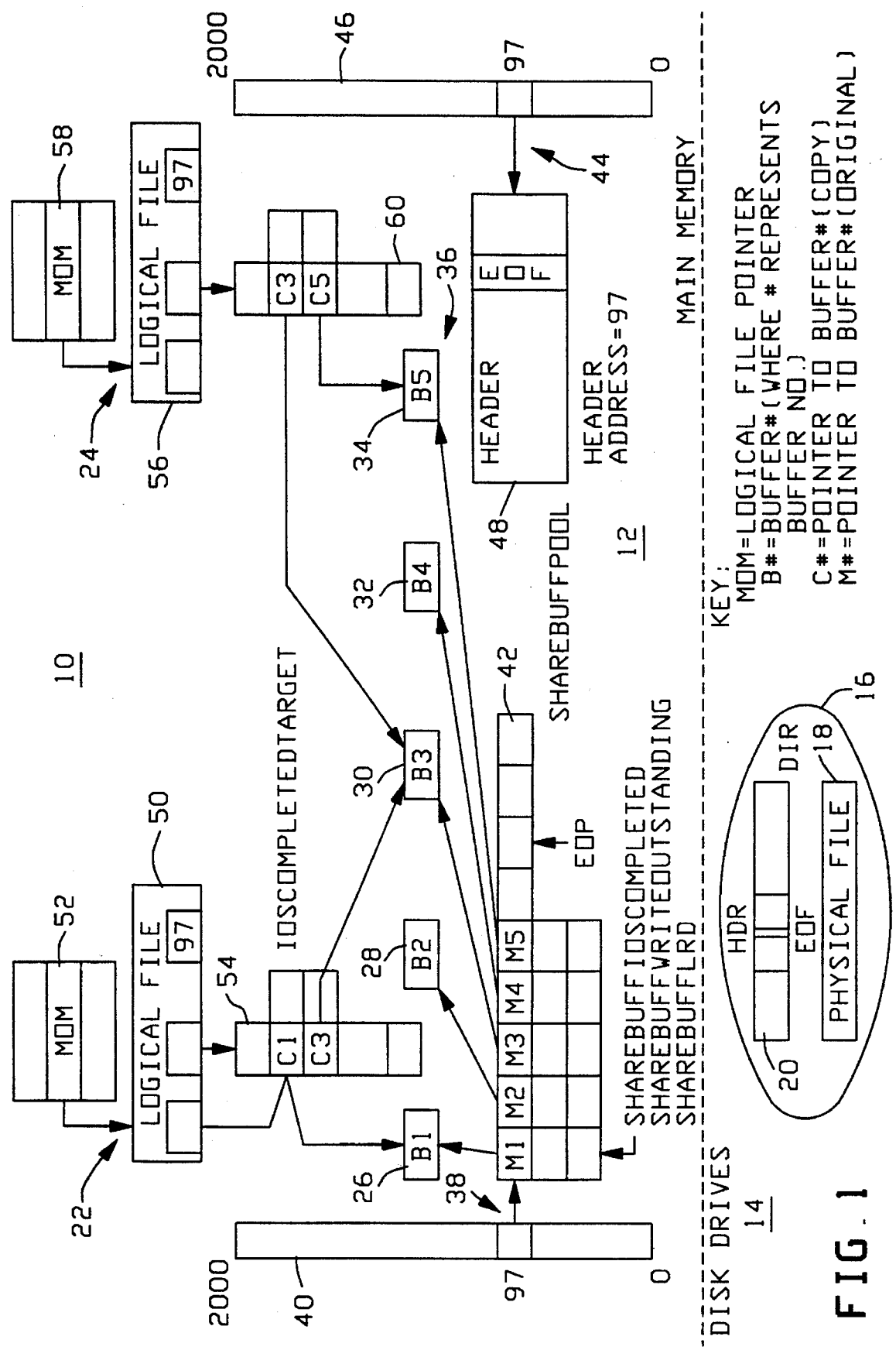
FIG. 1 is a diagrammatic representation of an arrangement of a digital computer main memory according to one embodiment of the present invention, and of a storage device such as a disk drive and media, for transfer of data therebetween.

Referring now to the drawings, wherein like reference characters designate like or corresponding parts throughout the several views, there is shown in FIG. 1 a digital data processing system 10 including a main memory portion 12 and a disk drive 14. The disk drive 14 includes a disk or other suitable physical media 16 that includes at least one physical file 18 and a directory 20 for physical file(s) 18. However, it should be understood that the practice of the present invention is not limited to utilization of a disk drive as a storage device; any other suitable storage device such as a random access memory (RAM) could be so utilized instead. Also, instead of using a single such storage device, multiple such storage devices, such as concatenated disks, could instead be used, with a single directory being provided for that entire group.

As shown in FIG. 1, main memory portion 12 includes a portion containing a first program 22 and a portion containing a second program 24. As used herein, the terms program, job, user, and module are used interchangeably. Although only two programs 22 and 24 are shown in FIG. 1, it should be understood that the present invention can be practiced with any number of such programs. However, some particular advantages of the present invention are utilized when main memory portion 12 includes more than one program. Main memory portion 12 further includes a plurality of buffers 26, 28, 30, 32 and 34. Again, although five buffers are shown in FIG. 1, the present invention can be practiced with any number of buffers. Each such buffer is dedicated to a particular portion of physical file 18 (defined by disk file header or directory 20), but can each be utilized by (i.e. shared by) programs 22 and 24 and any other such program(s). Thus, a single shared buffer may have no user pointing to it, or one user pointing to it, or more than one user pointing to it. FIG. 1 illustrates one example of buffer sharing at a single point in time, in that logical file 50 points to buffers 26 and 30 while logical file 56 points to buffers 30 and 34 and neither logical file 50 and 56 points to any of buffers 28 and 32. For that example, logical file 50 has a link to buffer 26 and buffer 30. At that same instant, logical file 56 has a link to buffer 30 and buffer 34. Also, buffers 28 and 32 do not have any logical files linked to them at that instant. Nonetheless, buffers 28 and 32 may still have a valid copy of some physical space in the file, but they do not then have any unwritten changes in them, because a link from a logical file to a buffer is not removed until the physical write from that buffer to media 16 is accomplished. Otherwise, if the connection from such a buffer to the logical file is lost, and the data from that logical file is not written from that buffer to the media 16 or other storage location, then it would no longer be known who to inform that the data could not be written. Accordingly, a linkage between a logical file and a buffer is not broken if that logical file has done a write to that buffer and that write has not yet been forced out such as to physical media 16. However, it should be understood that a single logical file could be simultaneously linked to many more than two shared buffers. Buffers 26, 28, 30, 32 and 34 together constitute a buffer pool 36 and are accessed by a two-dimensional shared buffer pool array 38. Array 38 includes a row index 40 and a plurality of rows of buffer pool information container identified thereby, of which only one row 42 (pointed to by slot 97 of index or array 38 in FIG. 1) is shown in FIG. 1 for simplicity of illustration. Although in FIG. 1 row index 40 is indicated as indexing zero to 2000 rows, it should be understood that this number is merely illustrative and that the present invention can be practiced with any number of rows. An operand resizes array 38 and array 44 by changing the number of rows pointed to by each such array. Each row has a container or set of entries M, one for each shared buffer. For each buffer, there is an entry under that buffer's container or portion of the shared buffer pool row to indicate whether a read of the content of that buffer is being performed, whether there is a write to that buffer outstanding and whether the commanded input/output (I/O) operation for that shared buffer has been completed. Parallel to array 38 there is also a two-dimensional header index array 44 including a row index 46 and a plurality of header index rows for that array. For simplicity of illustration, only one such header index row 48 (pointed to by slot 97 of array 40 in FIG. 1) is shown in FIG. 1. Although an index 46 for zero to 2000 header index rows is shown in FIG. 1, it should be understood that this number is merely illustrative and that the present invention can be practiced with any number of rows. However, a buffer pool row and a header index row will be needed for each set of shared buffers corresponding to a physical disk file. For this embodiment, the buffers, logical files, containers and indexes of FIG. 1 are pieces of main memory 12.

First program 22 includes one or more logical files 50 and an index 52 of MOM or prime descriptors for those logical files. Each logical file has a set of one or more buffer information containers 54. Likewise, second program 24 includes one or more logical files 56 and an index 58 of MOM descriptors for same. Each such logical file 56 includes a set of one or more buffer information containers 60. Index 52 contains a MOM descriptor for each logical file 50 of program 22. Index 58 contains a MOM descriptor for each logical file 56 of second program 24. As shown in FIG.

1, each logical file has such a container for each physical file, and each such container contains an entry for each buffer in the pool dedicated to that physical file.

Thus, each open physical disk file has its own private set of buffers. This set of buffers is shared among all of the logical files which have the physical disk file open, and are using buffer sharing. It is possible, but not required, to force all logical files using a given physical disk file to use buffer sharing.

Regarding logical file data structures, each open physical disk file has an associated integer value, known as its disk file header index, which uniquely identifies that physical disk file within the context of the entire system 10. In the attached code listings, the variable UNITNUMBER is an element of the logical file structure being operated upon, and contains the disk file header index of the physical disk file which is being used by the logical file.

Each logical file 50, 56, etc. has an associated set 54, 60, etc. of one or more buffer information containers, each of which may contain information about a buffer in use by the logical file. In the code listings below, IOAREA is an element of the logical file structure being operated upon, and contains a deindexed reference to the currently in-use buffer information container. The buffer information container includes elements IOADW, BUFFPOOLINDEX, IOSCOMPLETEDTARGET, IOAW.IOOUTSTANDINGF and IOCBDESC. When the buffer information container is linked to a shared buffer, element IOADW holds the file relative address of the beginning of the file space mapped to that buffer. When the buffer information container is not linked to a shared buffer, then element IOADW holds a value of −1. Element IOADW is checked against the value of −1 whenever it is necessary to determine whether or not a buffer information container is linked to a shared buffer.

When the buffer information container is linked to a shared buffer, then element BUFFPOOLINDEX holds the index of that buffer in the structure holding all the shared buffers for the physical disk file. Thus, the variable elements UNITNUMBER and IOAREA[BUFFPOOLINDEX] together uniquely identify the correct buffer within the context of all buffers in the system 10.

When the buffer information container is linked to a shared buffer, and the logical file then accessing that buffer has not modified the data in that buffer since the link between the two was created, then element IOSCOMPLETEDTARGET holds a value of 1. When the buffer information container is linked to a shared buffer, and this logical file has modified the data in that buffer since the link was created, then element IOSCOMPLETEDTARGET holds a value of one plus the value which variable element SHAREDBUFFIOSCOMPLETED held at the time that this logical file most recently modified the data in that buffer.

When the buffer information container is linked to a shared buffer, then element IOAW.IOOUTSTANDINGF holds its value true when the logical file manipulation routines must invoke procedure or routine SHAREDBUFFWAITP before either using that buffer or delinking from that buffer.

When the buffer information container is linked to a shared buffer, then element IOCBDESC contains the logical result descriptor most recently reported to this container (as a result of an invocation of routine SHAREDBUFFWAITP, described below). A logical result descriptor contains a Boolean flag reflecting overall success/failure of an I/O operation, and other fields containing more detailed information concerning the outcome of the I/O operation.

Regarding locking, all routines in the code listings below are executed from logical file manipulation routines which have already obtained the lock which guards access to the logical file's data structures.

Regarding buffer pool data structures, the set of shared buffers corresponding to a physical disk file is stored in a row of the system-wide global data structure SHAREDBUFFPOOL. The appropriate row in that structure is selected by indexing by the physical disk file's disk file header index, described above. Most of the routines in the code listings below declare a local reference structure named POOL and use it to hold a de-indexed reference to the appropriate row of global data structure SHAREDBUFFPOOL. Each row of structure SHAREDBUFFPOOL contains a number of elements reflecting on or indicative of the overall status of the shared buffer pool. Among those elements are element SHAREDBUFFTOTALRECS and element SHAREDBUFFHEADERTOTALRECS. Element SHAREBUFFTOTALRECS is the bound on records which have been transferred to buffers. Element SHAREDBUFFHEADERTOTALRECS is the bound on records spanned by the largest end-of-file (EOF) value which has been successfully recorded in the disk file header on the physical disk media.

Each row of structure SHAREDBUFFPOOL also contains a set of one or more buffers. Each such buffer includes the nine elements described immediately below. The value of element SHAREDBUFFBUFFER points to the data space for that buffer. The value of element SHAREDBUFFFILEADDRESS shows the file relative address of the beginning of the file space mapped to the buffer. The value of element SHAREDBUFFSECTORS indicates the length of the file space mapped to the buffer. The value of element SHAREDBUFFIOCB indicates the physical I/O control structure for the buffer. Element SHAREDBUFFEVENT is the synchronization variable used by the physical I/O routines invoked at several points in the code printout given below to report physical I/O completion. Element SHAREDBUFFLRD is the logical result descriptor of the physical I/O most recently processed by routine SHAREDBUFFWAITP. While the buffer is initially being read (and therefore does not yet have valid data), element SHAREDBUFFIOSCOMPLETED contains a value of zero. When the buffer has valid data, but no writes have been processed by routine SHAREDBUFFWAITP, element SHAREDBUFFIOSCOMPLETED contains a value of one. Otherwise, element SHAREDBUFFIOSCOMPLETED contains a value of one plus the number of writes which have been processed by routine SHAREDBUFFWAITP. While a buffer is being written (from the time that the write command for same is issued to the time that the write completion is processed by routine SHAREDBUFFWAITP), element SHAREDBUFFWRITEOUTSTANDING contains a value of true. The value of element SHAREDBUFFUSERS indicates the number of logical file buffer information containers linked to the shared buffer. Such linkage is established by routine ASSOCIATESHAREDBUFFERP and is broken by routine DISASSOCIATESHAREDBUFFERBODY, both described below. In other words, routine ASSOCIATESHAREDBUFFERP initiates the reading process.

The major routines shown in the flowcharts of FIGS. 2–9 and shown in the following code printouts include ASSOCIATESHAREDBUFFERP, INITIATESHAREDWRITEP, SHAREDBUFFWAITP, DISASSOCIATESHAREDBUFFERBODY, MODIFYSHAREDBUFFPREFACE, MODIFYSHAREDBUFFEPILOG, MODIFYSHAREDBUFFPAUSE, MODIFYSHAREDBUFFRESUME, CHECKSHAREDEOF and SHAREDBUFFSYNCDSKEOFP. These routines are invoked from the logical file manipulation routines in response to read and write requests from programs. The particular sequence of invocations will depend on the operation requested by the program and the current state of the logical file. Two example flows are given here for illustration purposes.

Figure 1A:
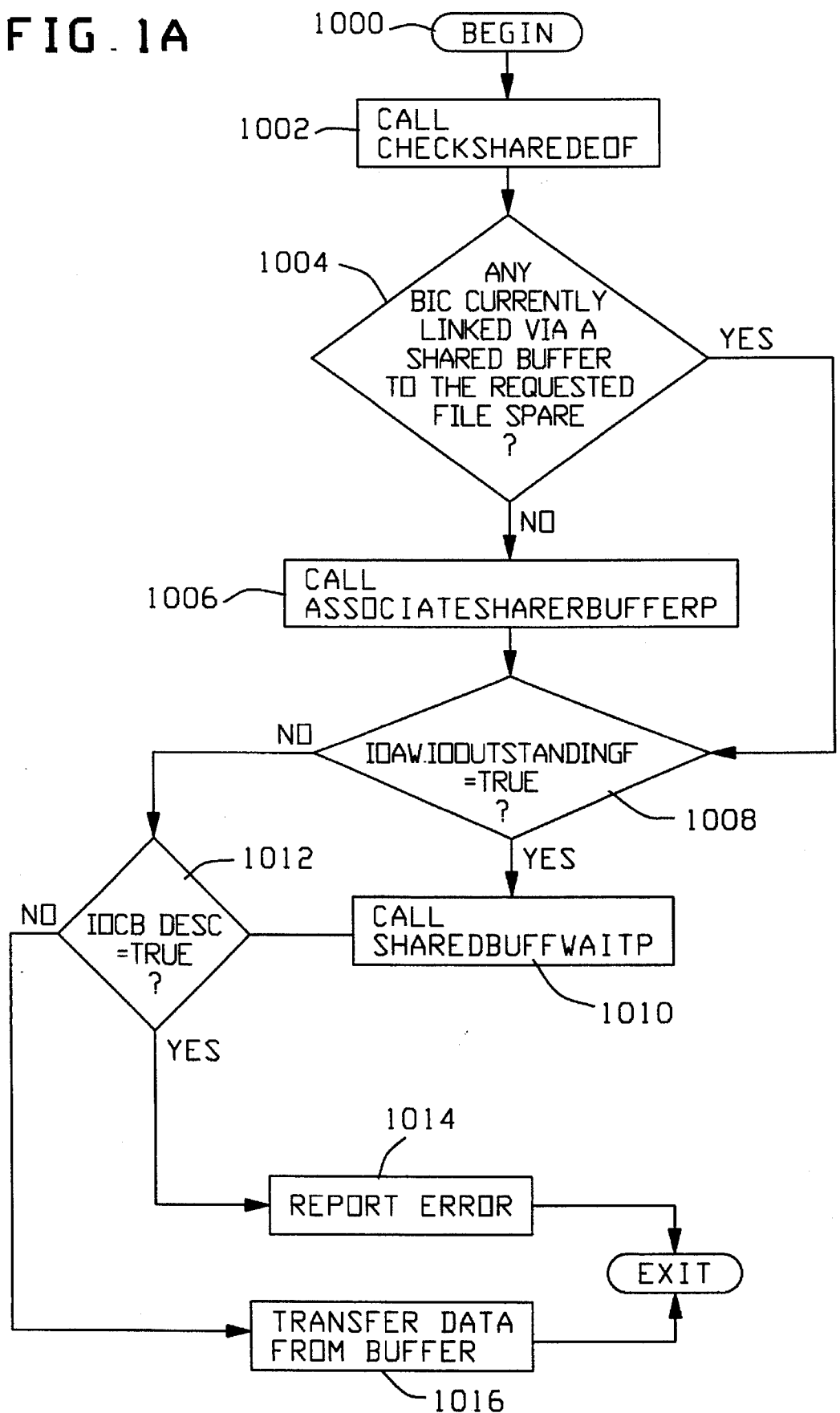
FIG. 1A is a flowchart showing a process, according to one embodiment of the present invention, for controlling operation of the apparatus of FIG. 1.

In response to a read request, at step 1002 logical I/O first invokes routine CHECKSHAREDEOF to ensure that the request is for data at a currently valid file address. Then, at step 1004 all buffer information containers are checked for a container currently linked to a shared buffer mapped to the required file space. If such a buffer is not found, then at step 1006 routine ASSOCIATESHAREDBUFFERP is invoked to establish a shared buffer in that state. (In order to free a buffer information container for this purpose, invocations of routine INITIATESHAREDWRITEP, routine SHAREDBUFFWAITP, and/or routine DISASSOCIATESHAREDBUFFERBODY may be needed. Any error detected on write at this point must be reported to the program.) Next, if variable IOAW.IOOUTSTANDINGF is true (step 1008), then routine SHAREDBUFFWAITP is invoked (step 1010). Next, if IOCBDESC is true (step 1012), then an error is returned to the program (step 1014). Otherwise, data is returned to the program from the buffer (step 1016). This sequence is illustrated in FIG. 1A.

Note that if the read request had spanned file space mapped to multiple buffers, the data transfer would have been performed in multiple segments, with buffer switches possibly involving invocations of routine ASSOCIATESHAREDBUFFERP, routine SHAREDBUFFWAITP, routine INITIATESHAREDWRITEP, and/or routine DISASSOCIATESHAREDBUFFERBODY.

Figure 1B:
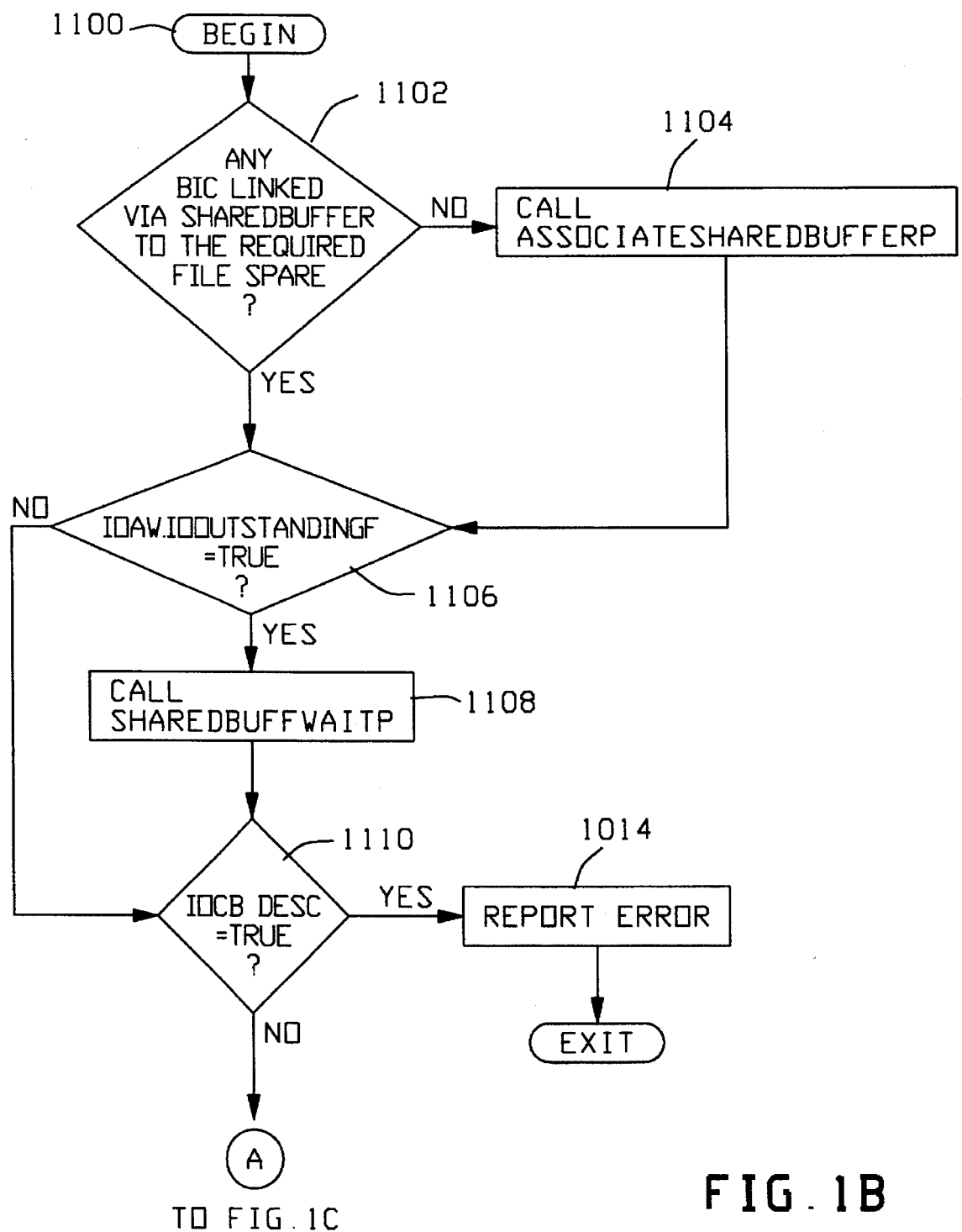
FIG. 1B is a flowchart showing a portion of another process, according to another embodiment of the present invention, for controlling operation of the apparatus of FIG. 1.
Figure 1C:
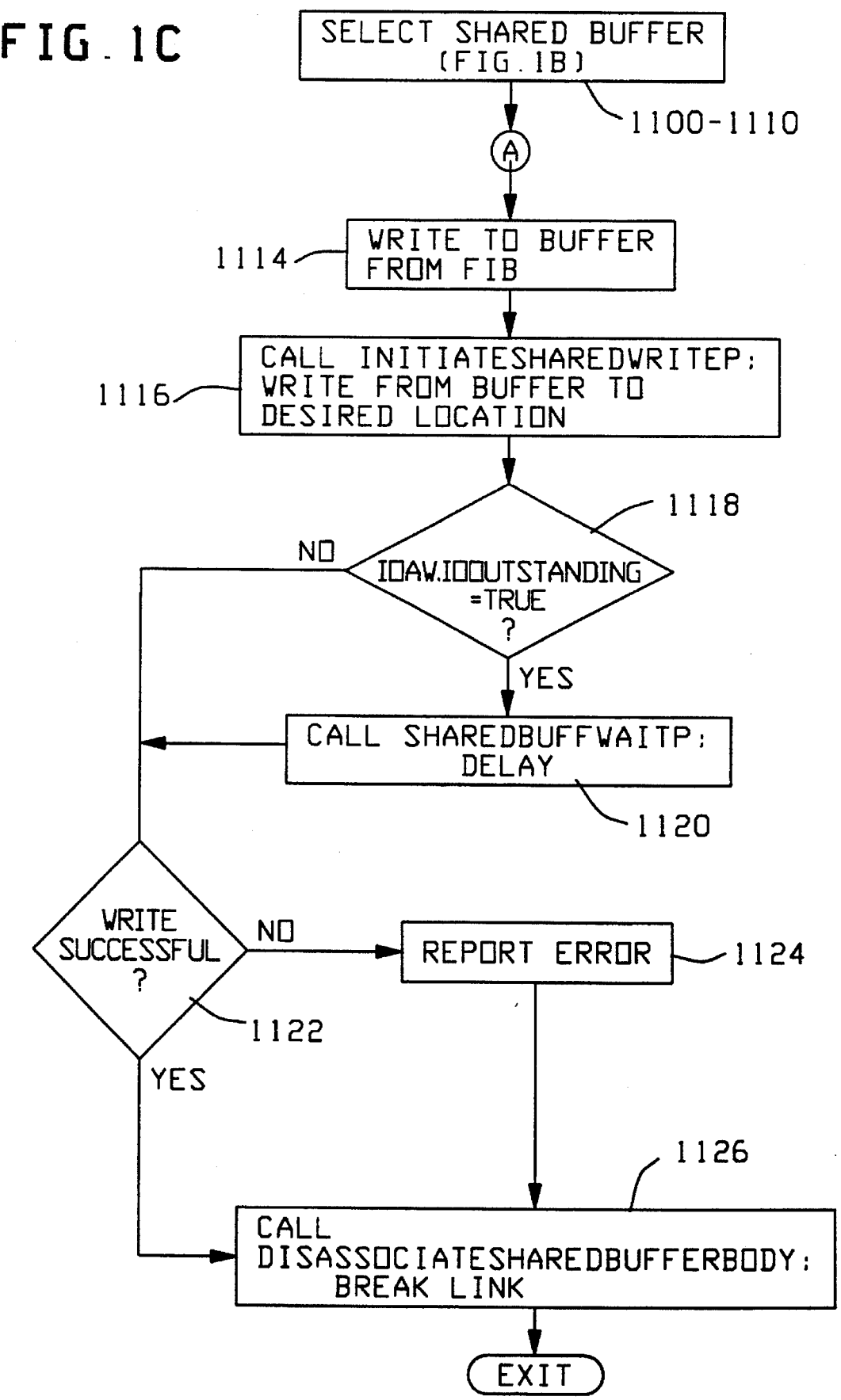
FIG. 1C is a flowchart showing another portion of the process partially shown in FIG. 1B for controlling operation of the apparatus of FIG. 1.

In response to a write request, as shown in FIG. 1B all buffer information containers are checked for a container currently linked to a shared buffer mapped to the required file space (step 1102). If such a buffer is not found, then routine ASSOCIATESHAREDBUFFERP is invoked (step 1104) to establish a shared buffer in that state. (In order to free a buffer information container for this purpose, invocations of routine INITIATESHAREDWRITEP, routine SHAREDBUFFWAITP, and/or routine DISASSOCIATESHAREDBUFFERBODY may be needed. Any error detected on write at this point must be reported to the program.) Next, if at step 1106 variable IOAW.IOOUTSTANDINGF is true, then at step 1108 routine SHAREDBUFFWAITP is invoked. Next, if at step 1110 variable IOCBDESC is true, then presence of an error is reported or returned to the program (step 1112). Otherwise, in FIG. 1C step 1114 data from the user program is stored in the buffer. This process for selecting a shared buffer is illustrated in FIG. 1B. FIG. 1C shows what happens after the shared buffer is selected.

This data transfer operation is bracketed by invocations of routine MODIFYSHAREDBUFFPREFACE and routine MODIFYSHAREDBUFFEPILOG. Immediately (if the program has requested that a physical write be issued and its result reported immediately), or at some later point (when the buffer information container is to be reused or when the logical file is being closed), routine INITIATESHAREDWRITEP is invoked by the logical file (step 1116); if at step 1118 variable IOAW.IOOUTSTANDINGF is then true, then routine SHAREDBUFFWAITP is invoked (step 1120); if variable IOCBDESC is then true (step 1122), then presence of an error is reported or returned to the program (step 1124). This sequence, which follows that of FIG. 1B, is illustrated in FIG. 1C.

Note that if the write request had spanned file space mapped to multiple buffers, then the data transfer would have been performed in multiple segments, with invocations of routine MODIFYSHAREDBUFFPAUSE and routine MODIFYSHAREDBUFFRESUME bracketing the buffer switch(es), and the buffer switch(es) possibly involving invocations of routine ASSOCIATESHAREDBUFFERP, routine SHAREDBUFFWAITP, routine INITIATESHAREDWRITEP, and/or routine DISASSOCIATESHAREDBUFFERBODY.

In one possible sequence of invocations of the routines in this embodiment of the present invention, once the shared buffer to be used for a data transfer has been identified (step 1113; also see FIG. 1B), the data in the buffer is then modified (step 1114) from the logical file (hereinafter referred to as the subject logical file) seeking to perform a write, e.g. to physical media 16. Routine INITIATESHAREDWRITEP is then invoked (step 1116; also see FIG. 3) to perform the write from the shared buffer to the media 16. During processing of routine INITIATESHAREDWRITEP, if routine INITIATESHAREDWRITEP places a value of true in element IOAW.IOOUTSTANDINGF, which is detected at step 1118, then routine SHAREDBUFFWAITP is invoked (step 1120; also see FIG. 4) to permit the physical I/O to occur. If data modified from the subject logical file fails to be successfully written to the physical disk media 16 (e.g. due to a path, drive or media error) (step 1122), then the logical result descriptor reported to that logical file (via element IOCBDESC) will reflect an error (step 1124). After the physical I/O to media 16 or elsewhere has been completed, routine DISASSOCIATESHAREDBUFFERBODY is invoked or called (step 1126) to delink the buffer information container from the currently linked shared buffer. This sequence, which (as discussed above) follows that of FIG. 1B, is illustrated in FIG. 1C.

In FIGS. 2–9, the eight-digit numbers in parentheses refer to the lines of code, in the following printout, where these operations are performed.

Figure 2A:
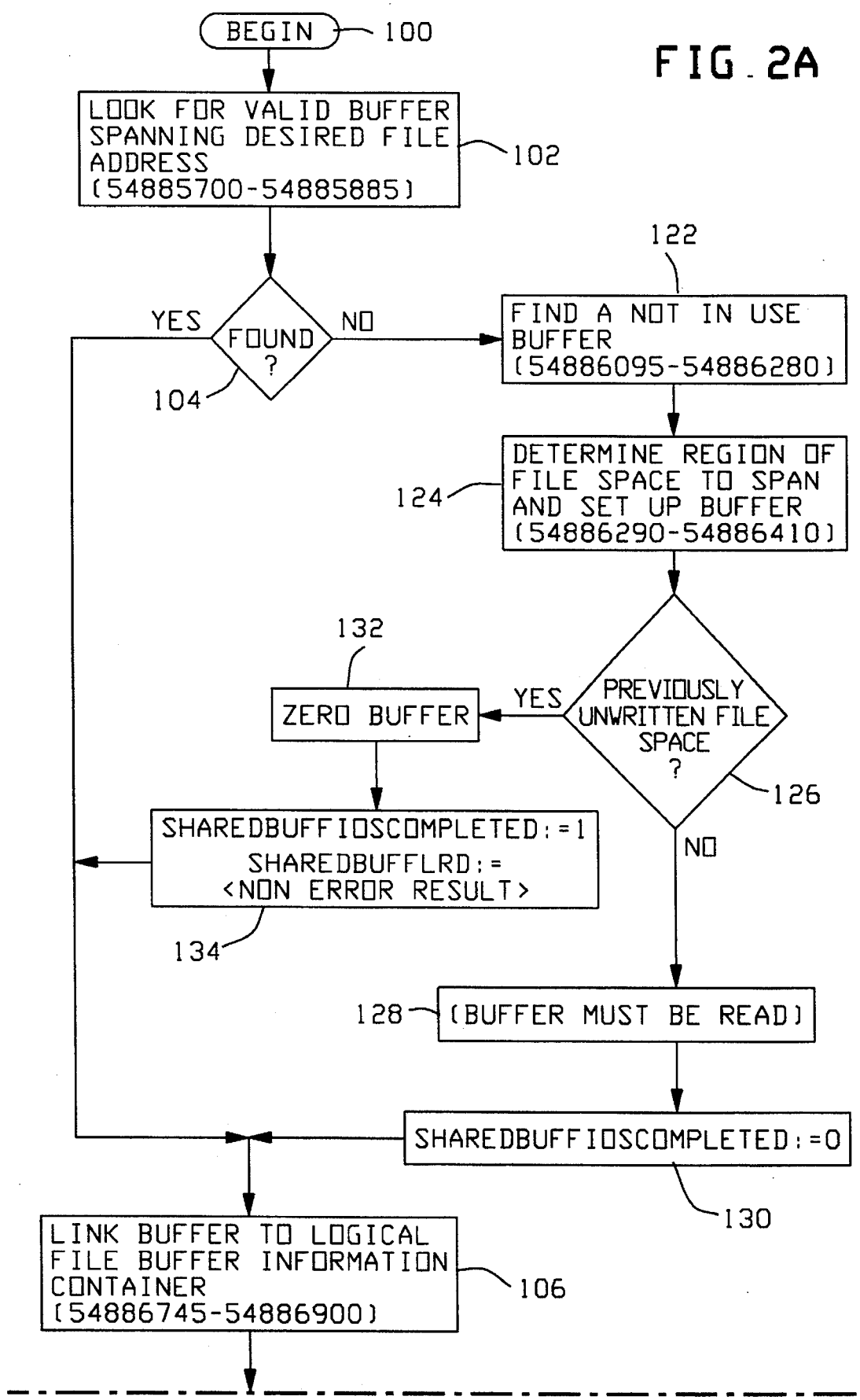
FIG. 2 is a flowchart showing a portion of a process, according to one embodiment of the present invention, for controlling operation of the apparatus of FIG. 1.

Routine ASSOCIATESHAREDBUFFERP is invoked by the logical file manipulation routines whenever a buffer spanning a given file relative address is needed. If routine ASSOCIATESHAREDBUFFERP places a value of true in element IOAW.IOOUTSTANDINGF, then routine SHAREDBUFFWAITP must be invoked before the data in that buffer is accessed. A flowchart for routine ASSOCIATESHAREDBUFFERP is shown in FIG. 2. In FIG. 2, once this routine has been called or initiated, the routine first looks for a valid buffer spanning the desired file address (step 102). If such a buffer is found (step 104), then that buffer is linked to the logical file buffer information container for the logical file containing the information to be transferred (step 106). In that container, element IOSCOMPLETEDTARGET is set equal to 1 (step 108). It is then determined whether the present value of buffer element SHAREDBUFFIOSCOMPLETED is greater than zero (step 110), indicating that the buffer has valid data. If so, then the value of element IOAW.IOOUTSTANDINGF is set to false, and the value of element IOCBDESC is set equal to the value of element SHAREDBUFFLRD (step 112). Otherwise, if the value of element SHAREDBUFFIOSCOMPLETED is equal to zero, then the value of element IOAW.IOOUTSTANDINGF is set equal to true (step 114), indicating that routine SHAREDBUFFWAITP must be invoked before using or delinking from the buffer. At step 116 directly following step 112 and step 114, it is determined whether the buffer linked at step 106 must be read; this determination is based on the result of the test at step 126.

If the buffer must be read, then a read command is issued at step 118, after which routine ASSOCIATESHAREDBUFFERP is exited (step 120). If step 116 instead does not find that the buffer linked at step 106 must now be read, then the routine is exited at step 120 without a read command being issued at step 118. However, if step 104 determines that a valid buffer spanning the desired file address has not been found by step 102, then instead of proceeding directly to step 106, a buffer not then in use is found at step 122. The region of file space to span and set up the buffer of step 122 is then determined at step 124. If the file space of step 124 has been previously written to (step 126), then the buffer must be read, which is performed at subsequent step 118. (step 128 records this requirement in a local variable.) After step 128, the value of element SHAREDBUFFIOSCOMPLETED is set equal to zero at step 130, after which the process links that buffer to the logical file buffer information container at step 106. Otherwise, if the file space identified at step 124 is previously unwritten file space (step 126), then the content or value of that file space is set to all zeros (step 132). After the buffer of steps 122 and 124 has been zeroed at step 132, then at step 134 the value of element SHAREDBUFFIOSCOMPLETED is set equal to 1, and element SHAREDBUFFLRD is provided with a value indicating a non error result. Step 106 directly follows each of steps 130 and 134.

Figure 3:
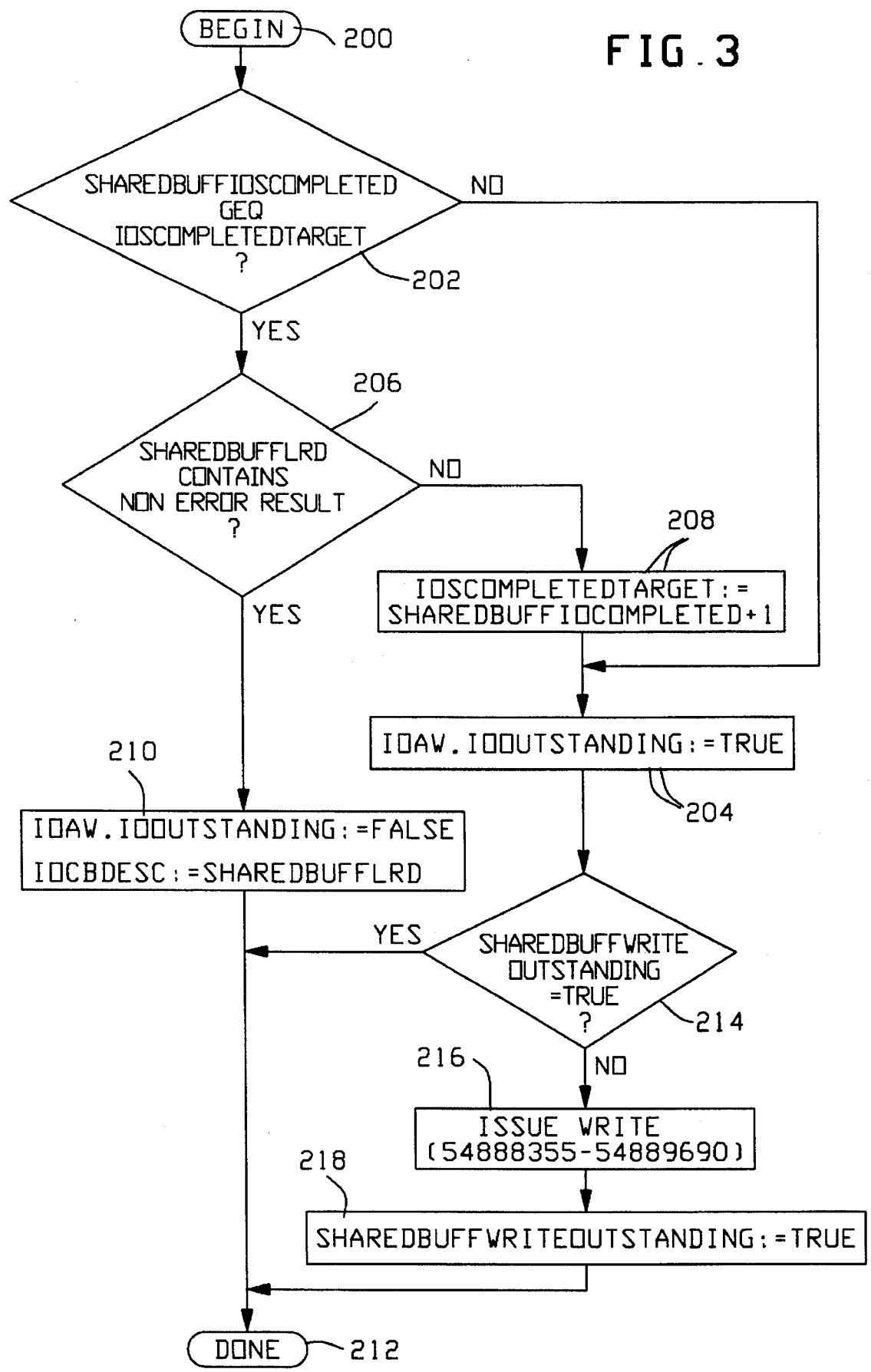
FIG. 3 is a flowchart showing another portion of a process, according to one embodiment of the present invention, for controlling operation of the apparatus of FIG. 1.

Routine INITIATESHAREDWRITEP is invoked by the logical file manipulation routines after the point where the data in the buffer being accessed has been modified from the subject logical file providing that data, and before the point where that buffer is delinked from that logical file. This routine must be invoked at the point where the user (e.g. the program) of the logical file requires that the data reach the physical disk media 16, even if that buffer is not to be delinked from the subject logical file at that point. For example, in a POSIX (Portable Operating System Interface) compliant operating system, the fsync function would invoke this routine. A flowchart for routine INITIATESHAREDWRITEP is shown in FIG. 3. After this routine is invoked (step 200), it is then determined at step 202 whether element SHAREDBUFFISOCOMPLETED is greater than or equal to the present value of element IOSCOMPLETEDTARGET. If not, then the routine sets the value of element IOAW.IOOUTSTANDINGF to be true at step 204. Otherwise, from step 202 the routine proceeds to step 206 at which it is determined whether element SHAREDBUFFLRD contains a non error result. If not, then at step 208 the value of element IOSCOMPLETEDTARGET is set equal to the value of element SHAREDBUFFIOSCOMPLETED (the number of writes which have been processed by routine SHAREDBUFFWAITP) plus 1. Immediately after step 208, at step 204 the value of element IOAW.IOOUTSTANDINGF is set to true, which will cause an invocation of routine SHAREDBUFFWAITP. If at step 206 the value of element SHAREDBUFFLRD is found to contain a non error result, then at step 210 the value of element IOAW.IOOUTSTANDINGF is set to false, and the value of element IOCBDESC is set equal to the value of element SHAREDBUFFLRD. After step 210, routine INITIATESHAREDWRITEP is exited (step 212). After step 204, it is determined at step 214 whether the value of element SHAREDBUFFWRITEOUTSTANDING is true (indicating that a buffer is then being written to). If so, then routine INITIATESHAREDWRITEP is exited (step 212). Otherwise, after step 214 a write to the designated buffer is issued at step 216. After step 216, the value of element SHAREDBUFFWRITEOUTSTANDING is set to true (step 218), after which routine INITIATESHAREDWRITEP is exited (step 212).

Figure 4:
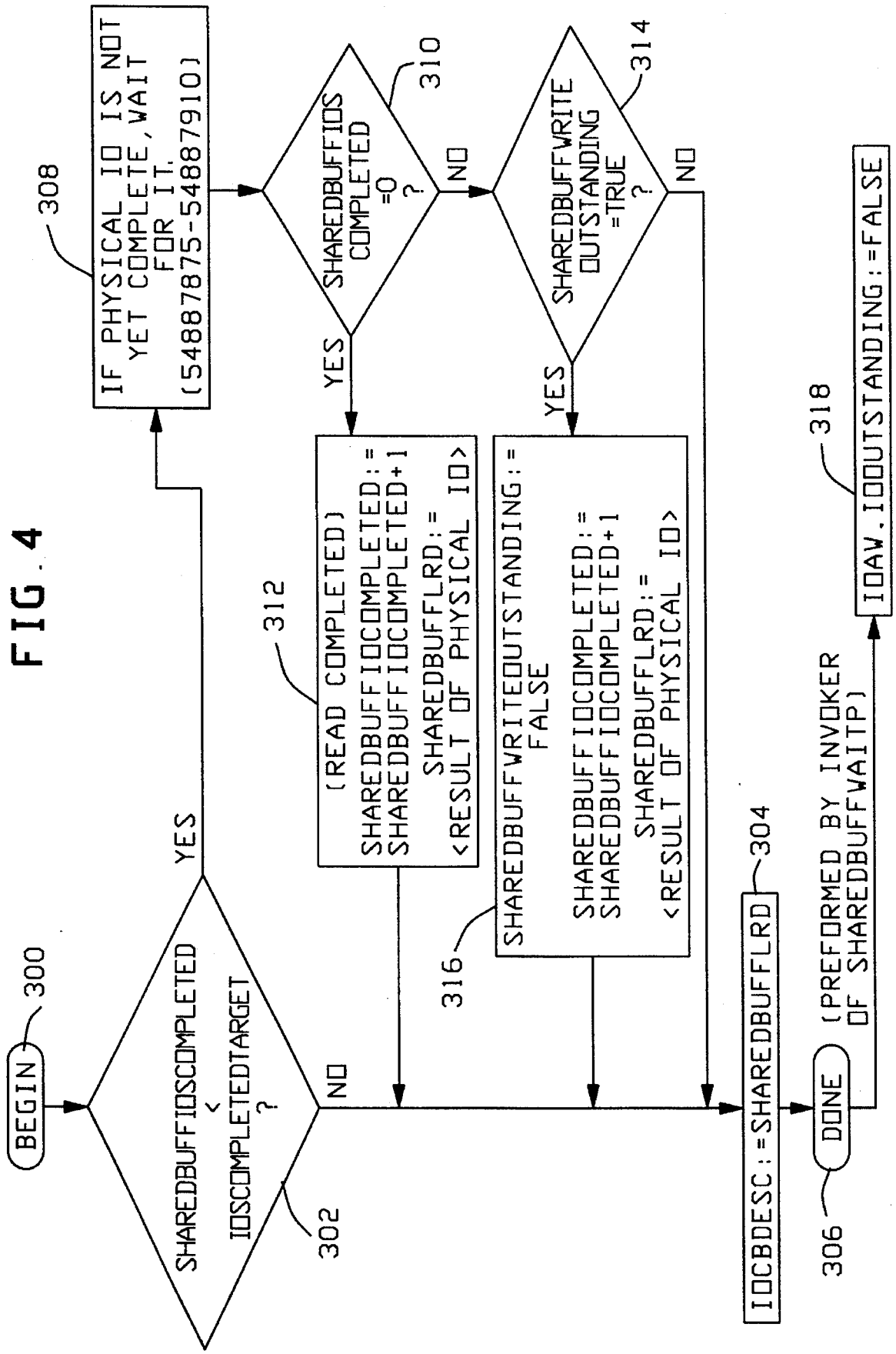
FIG. 4 is a flowchart showing another portion of a process, according to one embodiment of the present invention, for controlling operation of the apparatus of FIG. 1.

Routine SHAREDBUFFWAITP is invoked by the logical file manipulation routines after an invocation of either routine ASSOCIATESHAREDBUFFERP or routine INITIATESHAREDWRITEP leaves the value true in element IOAW.IOOUTSTANDINGF. Routine SHAREDBUFFWAITP waits for the physical I/O to complete (if it is not already completed), and reports the result via element IOCBDESC. Routine SHAREDBUFFWAITP must be invoked (after routine INITIATESHAREDWRITEP is exited) at the point where the user of the subject logical file requires that the data reach the physical disk media 16, even if the buffer is not to be delinked from the subject logical file at that point. For example, in a POSIX compliant operating system, the fsync function would invoke this routine. Routine INITIATESHAREDWRITEP and routine SHAREDBUFFWAITP are responsible for maintaining the following invariant: If data modified from the subject logical file fails to be successfully written to the physical disk media 16 (e.g. due to a path, drive, or media error), then the logical result descriptor reported to that logical file (via element IOCBDESC) must reflect an error. Logical file manipulation routines are responsible for insuring that errors reported via element IOCBDESC are properly reported to the client or user of the subject logical file. A flowchart for routine SHAREDBUFFWAITP is shown in FIG. 4. After this routine is invoked (step 300), it is determined at step 302 whether the value of element SHAREDBUFFIOSCOMPLETED is less than the value of element IOSCOMPLETEDTARGET. If not, then at step 304 the value of element SHAREDBUFFLRD is placed in element IOCBDESC (step 304), after which the routine is exited (step 306). Otherwise, if at step 302 the value of element SHAREDBUFFIOSCOMPLETED is found to be less than the value of element IOSCOMPLETEDTARGET, then at step 308 if the physical I/O is not yet completed, then the routine waits for that completion. After step 308, it is determined at step 310 whether the value of element SHAREDBUFFIOSCOMPLETED is equal to zero, indicating that the buffer has just been read. If so, then since this read is now completed, at step 312 the routine then increments by one the value of element SHAREDBUFFIOSCOMPLETED, and sets the value of element SHAREDBUFFLRD to show the result of that physical I/O. step 312 is immediately followed by step 304 discussed above, after which the routine is exited (step 306). Otherwise, if at step 310 the value of element SHAREDBUFFIOSCOMPLETED is not equal to zero (indicating that the buffer has just been written to physical media), the routine next determines whether the value of element SHAREDBUFFWRITEOUTSTANDING is true (indicating that the write completion has not yet been processed by another invocation of routine SHAREDBUFFWAITP) at step 314. If so, then at step 316 the value of element SHAREDBUFFWRITEOUTSTANDING is set false to indicate that the write from that buffer has been completed, the value of element SHAREDBUFFIOSCOMPLETED is incremented by one, and the value of element SHAREDBUFFLRD is set to indicate the result of that physical I/O. Step 316 is immediately followed by step 304 discussed above, after which the routine is exited (step 306). Otherwise, if at step 314 the value of element SHAREDBUFFWRITEOUTSTANDING is found to be false, then the routine proceeds directly to step 304, after which the routine is exited (step 306). After routine SHAREDBUFFWAITP is exited, the user invoking that routine sets the value of element IOAW.IOOUTSTANDINGF to be false, so that routine SHAREDBUFFWAITP is not unnecessarily reinvoked (step 318).

Routine DISASSOCIATESHAREDBUFFERBODY is invoked by the logical file manipulation routines to delink a buffer information container from its currently linked buffer. It is the responsibility of the logical file manipulation routines to have previously invoked routine INITIATE-SHAREDWRITEP since (and if) the buffer data was last modified from the subject logical file. It is the responsibility of the logical file manipulation routines to have already invoked routine SHAREDBUFFWAITP if necessary, i.e. element IOAW.IOOUTSTANDINGF must hold the value of false when routine DISASSOCIATESHAREDBUFFER-BODY is invoked.

Invocations of routines MODIFYSHAREDBUFFPREFACE and MODIFYSHAREDBUFFEPILOG bracket the code in the logical file write routines which transfer data to buffers. By ensuring that the shared buffer pool 36 lock is held and that the value of element SHAREDBUFFWRIT-EOUTSTANDING is false at the start of data transfer, routine MODIFYSHAREDBUFFPREFACE (and routine MODIFYSHAREDBUFFRESUME) ensure that no physical write is in process, and that no physical write can begin, during data transfer to a buffer 26, 28, 30, 32 or 34.

Figure 5:
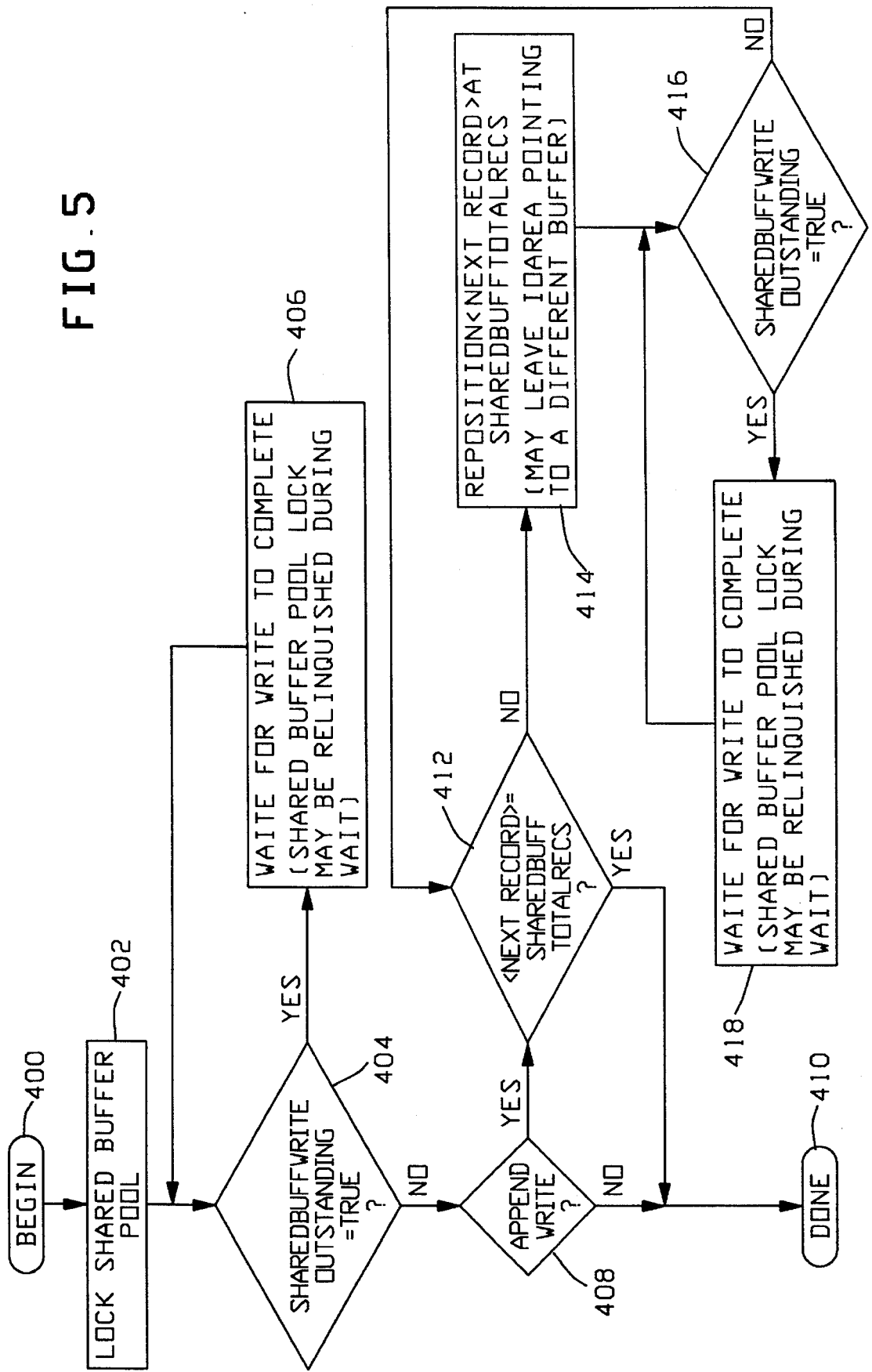
FIG. 5 is a flowchart showing another portion of a process, according to one embodiment of the present invention, for controlling operation of the apparatus of FIG. 1.

A flowchart for routine MODIFYSHAREDBUFFPREFACE is shown in FIG. 5. After the routine is invoked (step 400), the shared buffer pool is locked (step 402). After step 402, at step 404 it is determined whether element SHAREDBUFFWRITEOUTSTANDING has a value of true, indicating that a buffer is then being written to physical media. If so, then the routine waits for that write to be completed (step 406); the shared buffer pool lock of step 402 may be relinquished during this wait, but must be reinstated thereafter. If at step 404 element SHAREDBUFFWRITEOUTSTANDING has a value of false, then at step 408 it is determined whether an APPEND write is then in progress. If not, then the routine is exited (step 410). Otherwise, if at step 408 an APPEND write is detected, then at step 412 it is determined whether the next record to be so written is element SHAREDBUFFTOTALRECS. If so, then the routine is exited (step 410). Otherwise, at step 414 the next record is repositioned at the bound defined by the value of element SHAREDBUFFTOTALRECS. This may cause a change in which shared buffer is pointed to by element IOAREA. The routine at step 416 then again determines whether element SHAREDBUFFWRITEOUTSTANDING has a value of true. If so, then at step 418 the routine waits for the write thereby indicated to be completed; the shared buffer pool lock may be relinquished during this wait. If at step 416 element SHAREDBUFFWRITEOUTSTANDING has a value of false, then the routine returns to step 412, from which it may exit (step 410) or may again proceed to step 414 described above.

Figure 6:
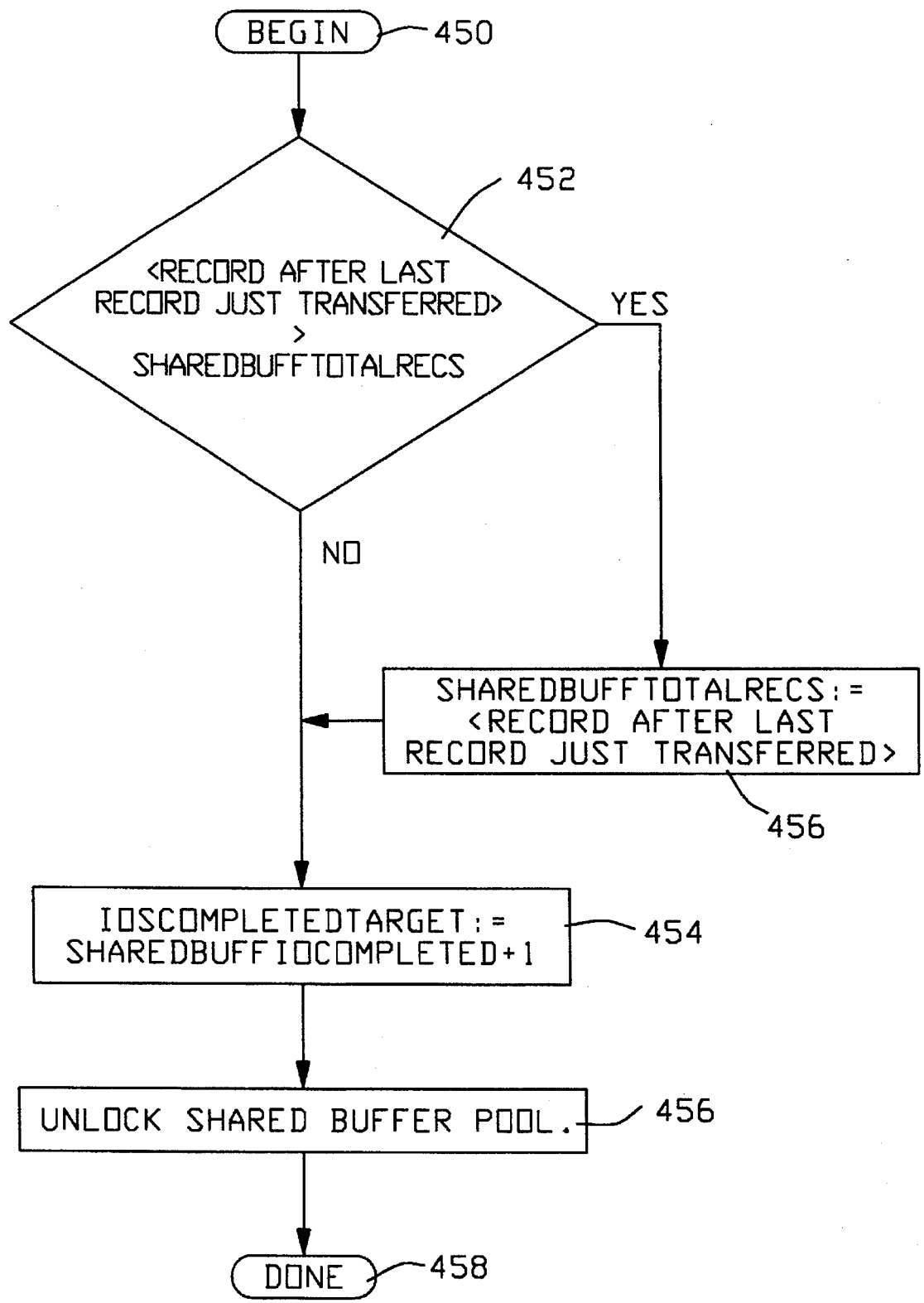
FIG. 6 is a flowchart showing another portion of a process, according to one embodiment of the present invention, for controlling operation of the apparatus of FIG. 1.

A flowchart for routine MODIFYSHAREDBUFFEPILOG is shown in FIG. 6. After that routine is invoked (step 450), the routine determines whether the location or address value of the record after the last record just transferred is greater than the value of element or variable SHAREDBUFFTOTALRECS, the bound on records which have been transferred to buffers. If not, then at step 454 element or variable IOSCOMPLETEDTARGET is given a value equal to that of element SHAREDBUFFIOSCOMPLETED plus one, indicating that the buffer has been modified to contain valid data that must be written to physical media 16 at some point in the future. Otherwise, between step 452 and step 454, element SHAREDBUFFTOTALRECS is given a value indicative of the location or address of the record after the last record that had just been transferred. After step 454, the shared buffer pool 36 is unlocked (step 456), and the routine is exited (step 458).

Invocations of routine MODIFYSHAREDBUFFPAUSE and of routine MODIFYSHAREDBUFFRESUME bracket the point in the logical file write routines where data transfer is interrupted to switch buffers. These routines are to be invoked only when logical file write operations span buffer boundaries. For non-APPEND writes, the shared buffer pool 36 lock is relinquished during this switch of buffers. Relinquishing the lock allows other write operations from other logical files to proceed concurrently with any physical I/O's which may be necessary to accomplish the switch of buffers. For APPEND writes, the shared buffer pool 36 lock is not relinquished during the switch of buffers. This provides atomicity of APPEND writes with respect to each other. The variable SHAREDBUFFLOCKHELD is set to true during this buffer switch. Element SHAREDBUFFLOCKHELD is an element of the logical file structure. Doing so prevents invocations of routine ASSOCIATESHAREDBUFFERP, routine INITIATESHAREDWRITEP, and routine SHAREDBUFFWAITP which occur during buffer switch from attempting to lock the shared buffer pool 36 (and thereby deadlocking). In this regard, see the listings below of routine LOCKSHAREDBUFFERPOOL and routine UNLOCKSHAREDBUFFERPOOL.

Figure 7:
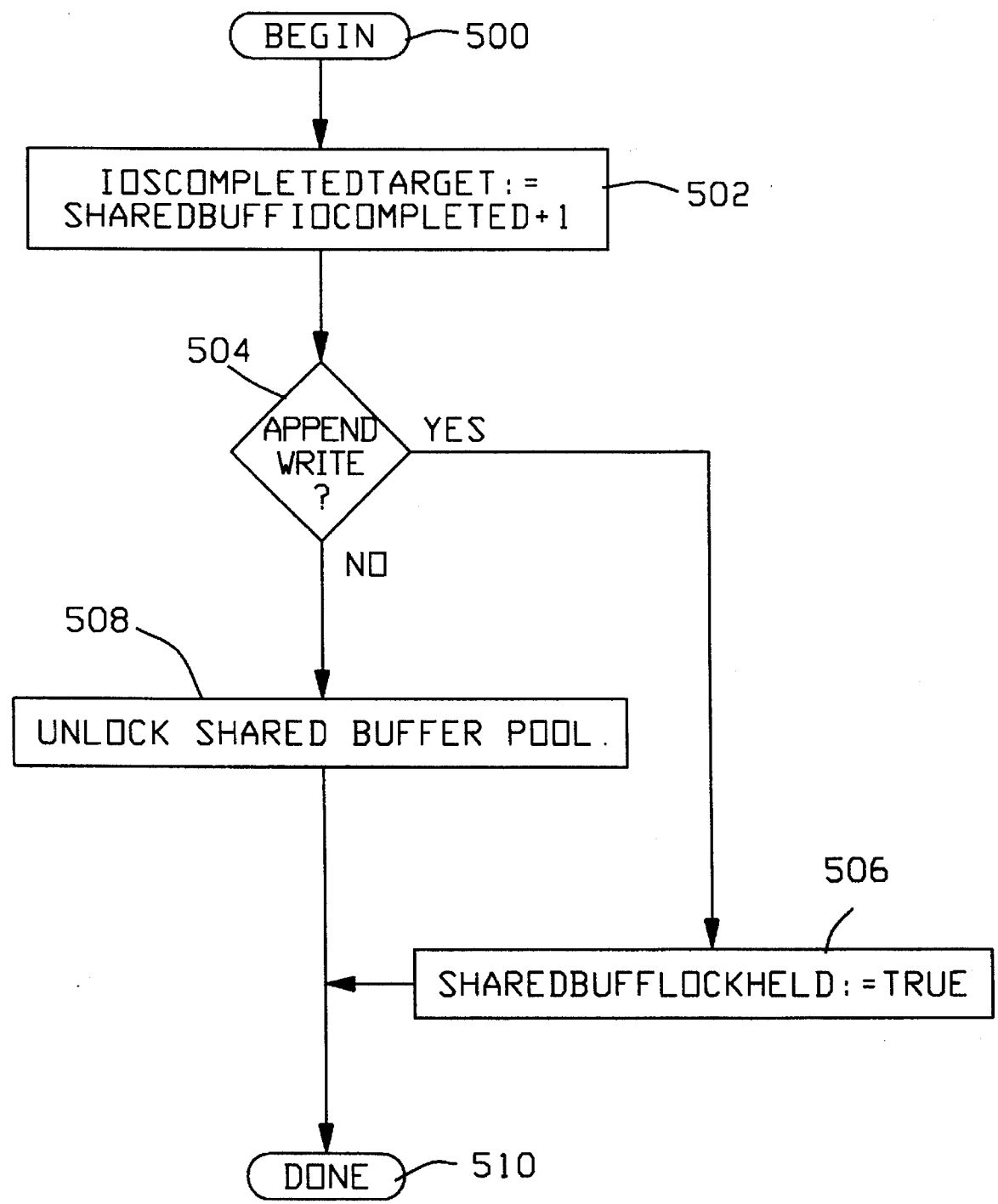
FIG. 7 is a flowchart showing another portion of a process, according to one embodiment of the present invention, for controlling operation of the apparatus of FIG. 1.

A flowchart for routine MODIFYSHAREDBUFFPAUSE is shown in FIG. 7. After that routine is invoked (step 500), at step 502 the value of element IOSCOMPLETEDTARGET is set equal to the value of element SHAREDBUFFIOSCOMPLETED plus one, indicating that the container is linked to a shared buffer and the subject logical file has modified the data in that buffer since this link was created. At step 504, it is determined whether an APPEND write is then being performed on that buffer. If so, then at step 506 element or variable SHAREDBUFFLOCKHELD is given a value of true. Otherwise, if no APPEND write is present at step 504, then at step 508 the shared buffer pool is unlocked. POSIX is described in International Standard ISO/IEC 9945-1 (IEEE Std 1003.1) Information Technology—Portable Operating System Interface (POSIX)—Part 1: System Application Program Interface (API) [C Language] which is hereby incorporated by reference herein. As discussed in International Standard ISO/IEC 9945-1: 1990, supra, at Part 1, page 119, lines 201–203: "If the O_APPEND flag of the file status flags is set, the file offset shall be set to the end of the file prior to each write, and no intervening file modification operation shall be allowed between changing the file offset and the write operation." After either of step 506 or step 508, this routine is exited (step 510).

Figure 8:
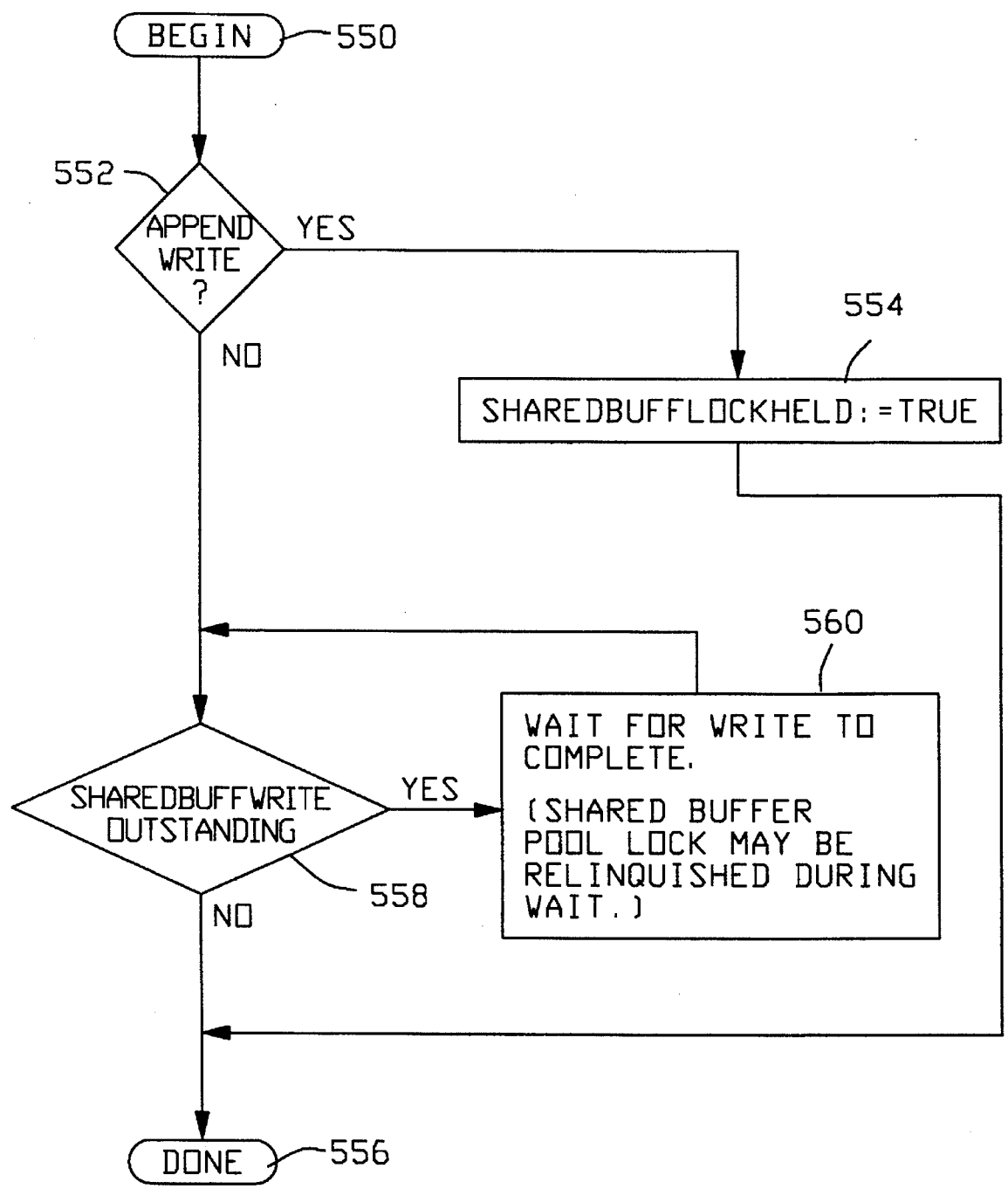
FIG. 8 is a flowchart showing another portion of a process, according to one embodiment of the present invention, for controlling operation of the apparatus of FIG. 1.

A flowchart for routine MODIFYSHAREDBUFFRESUME is shown in FIG. 8. After this routine is invoked or initiated (step 550), the routine determines whether an APPEND write is being performed (step 552). If so, then at step 554 element SHAREDBUFFLOCKHELD is given a value of false, after which the routine is exited (step 556). Otherwise, after step 552 the routine at step 558 determines whether element SHAREDBUFFWRITEOUTSTANDING has a value of true, indicating that the content of a buffer is then being written to physical media 16. If so, then at step 560 the routine waits for this write to be completed; the shared buffer pool 36 lock may be temporarily relinquished during this wait. If at step 558 element SHAREDBUFFWRITEOUTSTANDING is found to have a value of false, then the routine is exited (step 556).

Routine CHECKSHAREDEOF is invoked by the logical file read routines just before data transfer to buffers. Routine CHECKSHAREDEOF prevents reading beyond the current value of element SHAREDBUFFTOTALRECS. A flowchart for routine CHECKSHAREDEOF is shown in FIG. 9. After this routine is invoked or initiated (step 600), this routine first determines whether the location of the next record plus the number of records to be read is greater than the value of element SHAREDBUFFTOTALRECS (step 602). If not, then retransfer can continue (step 604). Otherwise, after step 602 the routine next determines at step 604 whether the location of the next record plus one is greater than the present value of element SHAREDBUFFTOTALRECS. If so, then the routine reports that the end of file has been reached (step 606), and any further retransfer is bypassed (step 608). Otherwise, after step 604 the routine prepares to report a short read (step 610), shortens the transfer then in progress so that it is bounded by the value of element SHAREDBUFFTOTALRECS (step 612), and then retransfer is permitted to continue (step 604).

Routine SHAREDBUFFSYNCDSKEOFP is invoked by the logical file manipulation routines after the end of file has been extended via write operations. If the value of element SHAREDBUFFTOTALRECS reflects an end of file that is greater than the end of file which has already been successfully recorded in the disk file header or directory 20 on the physical disk media 16, then routine SHAREDBUFFSYN-CDSKEOFP updates the disk file header on the physical disk media, waits for the write to complete, and reports an error if anything in this process was not completely successful. This routine must be invoked at the point where the user of the logical file requires that data which it has written beyond the old end of file reach the physical disk media 16, even if the logical file is not to be delinked from the shared buffer pool 36 at that point. For example, in a POSIX compliant operating system, the fsync function would invoke routine SHAREDBUFFSYNCDSKEOFP if any writes have been beyond the old end of file. Routine SHAREDBUFFSYN-CDSKEOFP is responsible for maintaining the following invariant: If data modified from the subject logical file fails to become part of the file due to failure to successfully write the physical disk file's disk file header 20, then an error must be reported to that logical file. Logical file manipulation routines are responsible for ensuring that any errors reported by routine SHAREDBUFFSYNCDSKEOFP are properly reported to the client or user of the logical file.

The present invention can be implemented in software. An example of such software, written in the NEWP language, is given in the following pages. However, other programming languages can be used for this purpose. FIGS. 2–9 show flowcharts for above-identified portions of this software.

```
LOCKSHAREDBUFFERPOOL OF FIBSTACK OF <LOGICALIO> OF <SOFTIO>  ::  DEFINE  ::
         DECLARED @ 54885175    ENDS @ 54885195

54885175    DEFINE LOCKSHAREDBUFFERPOOL =
54885180    BEGIN
54885185       IF NOT SHAREDBUFFLOCKHELD THEN
54885190           LOCK(SHAREDBUFFLOCK(UNITNUMBER));
54885195    END #;
```

UNLOCKSHAREDBUFFERPOOL OF FIBSTACK OF <LOGICALIO> OF <SOFTIO>  ::  DEFINE  ::
        DECLARED @ 54885205    ENDS @ 54885225

```
54885205    DEFINE UNLOCKSHAREDBUFFERPOOL =
54885210    BEGIN
54885215        IF NOT SHAREDBUFFLOCKHELD THEN
54885220            UNLOCK(SHAREDBUFFLOCK(UNITNUMBER));
54885225    END #;
```

ASSOCIATESHAREDBUFFERP OF FIBSTACK OF <LOGICALIO> OF <SOFTIO>   ::   REAL PROCEDURE
         @ (1,30E)   ::   DECLARED @ 54885500     ENDS @ 54887495

```
54885500    REAL PROCEDURE ASSOCIATESHAREDBUFFERP;
54885505    BEGIN
54885510        ARRAY REFERENCE POOL[0];
54885515        REAL             INX,
54885520                         ADDR,
54885525                         BOUND,
54885530                         LB,
54885535                         UB,
54885540                         ROWSECTORS,
54885545                         ROW,
54885550                         ROWAD,
54885555                         LEN;
54885560        LABEL            FOUND,
54885565                         DONE;
54885570
54885575        DEFINE ERROR(LRD) =
54885580        BEGIN
54885585            IOAREA[IOCBDESC]:=(LRD);
54885590            ASSOCIATESHAREDBUFFERP:=(LRD);
54885595            GO DONE;
54885600        END #;
54885605
54885610        LOCKSHAREDBUFFERPOOL;
54885615        POOL:=SHAREDBUFFPOOL[UNITNUMBER,*];
54885620        IF ACTUALBLOCK GEQ 0 THEN
54885625        BEGIN
54885630            INX:=IOAREA[BUFFPOOLINX];
54885650            DISASSOCIATESHAREDBUFFERBODY(POOL,INX);
54885675        END;
54885680        ASSERT(NOT BOOLEAN(IOAREA[IOAW].IOOUTSTANDINGF));
54885685        ROWSECTORS:=ROWSIZE(DHEADER);
54885690        ROW:=BLOCKCOUNT DIV ROWSECTORS;
54885695        % Look for the desired sector in the current set of buffers.
54885700        INX:=SHAREDBUFFMAXINX(POOL);
54885705        IF STREAMWFS THEN
54885710        BEGIN
54885715            LB:=0;
54885720            UB:=BLOCKCOUNT+SHAREDBUFFMAXSECTORS(POOL);
54885725            DO
54885730            BEGIN
54885735                IF SHAREDBUFFASSIGNED(POOL,INX) THEN
54885740                BEGIN
54885745                    ADDR:=SHAREDBUFFFILEADDRESS(POOL,INX);
54885750                    IF ADDR EQL BLOCKCOUNT THEN
54885755                        GO FOUND;
54885760                    IF ADDR LSS BLOCKCOUNT THEN
54885765                    BEGIN
54885770                        BOUND:=ADDR+SHAREDBUFFSECTORS(POOL,INX);
54885775                        IF BLOCKCOUNT LSS BOUND THEN
54885780                        BEGIN
54885785                            BLOCKCOUNT:=ADDR;
54885790                            GO FOUND;
54885795                        END;
54885800                        LB:=MAX(LB,BOUND);
54885805                    END ELSE
54885810                    BEGIN
54885815                        UB:=MIN(UB,ADDR);
54885820                    END;
54885825                END;
54885830                INX:=*-1;
54885835            END UNTIL INX LSS 0;
54885840        END ELSE
54885845        BEGIN
54885850            DO
54885855            BEGIN
54885860                IF SHAREDBUFFASSIGNED(POOL,INX) CAND
```

```
54885865                    SHAREDBUFFFILEADDRESS(POOL,INX) EQL BLOCKCOUNT THEN
54885870                       GO FOUND;
54885875                 INX:=*-1;
54885880              END UNTIL INX LSS 0;
54885885        END;
54885890        % The desired sector is not in the current set of buffers.
54885895        % If IO is out of bounds, reject it now.
54885900        IF BLOCKCOUNT GEQ SHAREDBUFFULTIMATEFILEBOUND(POOL) THEN
54885905        BEGIN
54885910           % Beyond ultimate file bound means beyond EOF on a
54885915           % crunched file, or beyond max rows on an uncrunched
54885920           % file.
54885925           ERROR(IF ROW GEQ MAXNUMBEROFROWSV
54885930                 THEN LIOLRD(ENDOFMEDIUMAV)
54885935                 ELSE LIOLRDEOFV              );
54885940        END;
54885945        % If necessary, expand disk file header.
54885950        IF ROW GEQ NUMBEROFROWS(DHEADER) THEN
54885955        BEGIN
54885960           REAL INC,
54885965                RSLT;
54885970
54885975           IF NOT FLEXIBLEFILE THEN
54885980              ERROR(LIOLRDEOFV);
54885985           INC:=MIN(ROW+5,MAXNUMBEROFROWSV)-NUMBEROFROWS(DHEADER);
54885990           RSLT:=ALTERNUMBEROFROWS(DHEADER,INC);
54885995           IF RSLT LSS 0 THEN % COULDN'T ADD ROWS
54886000           BEGIN
54886005              IF RSLT.SHAERRF EQL SHAHDRTOOLARGEV THEN
54886010              BEGIN
54886015                 % WE TRIED TO EXPAND THE HEADER BEYOND ITS MAX
54886020                 % ALLOWED SIZE; SEE IF WE CAN STAY WITHIN THE
54886025                 % LEGAL SIZE BY ADDING ONLY 1 ROW.
54886030                 INC:=(ROW+1)-NUMBEROFROWS(DHEADER);
54886035                 ASSERT(NUMBEROFROWS(DHEADER)+INC LEQ
54886040                        MAXNUMBEROFROWSV);
54886045                 IF ALTERNUMBEROFROWS(DHEADER,INC) LSS 0 THEN
54886050                    ERROR(LIOLRD(ENDOFMEDIUMAV));
54886055              END ELSE
54886060              BEGIN % SOME OTHER ERROR
54886065                 ERROR(LIOLRDEOFV);
54886070              END;
54886075           END;
54886080           TIMESTAMPANDUPDATEHEADER(DHEADER);
54886085        END;
54886090        % Find a buffer.
54886095        IF SHAREDBUFFALLOCATEDBUFFERS(POOL) LSS
54886100           SHAREDBUFFALLOWEDBUFFERS(POOL) THEN
54886105        BEGIN
54886110           INX:=SHAREDBUFFMAXINX(POOL);
54886115           WHILE SHAREDBUFFALLOCATED(POOL,INX) DO
54886120              INX:=*-1;
54886125           IF ALLOCATE_MCP_ARRAY(SHAREDBUFFBUFFER(POOL,INX),
54886130                        BUFFER_DATA_AREA_PROFILE(
54886135                           SHAREDBUFFMAXSECTORS(POOL)*
54886140                           WORDS_PER_SECTOR)
54886145                              & 1 DONTKILLMEF
54886150                              & OLAY_AND_RSVP SEARCHCONTROLF,
54886155                           0) THEN
54886160           BEGIN
54886165              % We were DSed out of a WORDS REQUIRED RSVP.
54886170              ERROR(LIOLRDCANCELV);
54886175           END;
54886180           SHAREDBUFFALLOCATED(POOL,INX):=TRUE;
54886185           SHAREDBUFFALLOCATEDBUFFERS(POOL):=*+1;
54886190           SUMBUFFSTATS(SHAREDBUFFBGCATEGORY(POOL),
54886195                        LENGTHOF(SHAREDBUFFBUFFER(POOL,INX)),
54886200                        1);
54886205           ASSERT(SHAREDBUFFUSERS(POOL,INX) EQL 0);
```

```
54886210        END ELSE
54886215        BEGIN
54886220            INX:=SHAREDBUFFLEFTOFF(POOL);
54886225            WHILE NOT SHAREDBUFFALLOCATED(POOL,INX) COR
54886230                    SHAREDBUFFUSERS(POOL,INX) GTR 0 DO
54886235            BEGIN
54886240                INX:=*-1;
54886245                IF INX LSS 0 THEN
54886250                    INX:=SHAREDBUFFMAXINX(POOL);
54886255                ASSERT(INX NEQ SHAREDBUFFLEFTOFF(POOL));
54886260            END;
54886265            SHAREDBUFFLEFTOFF(POOL):=IF INX EQL 0
54886270                                    THEN SHAREDBUFFMAXINX(POOL)
54886275                                    ELSE (INX)-1;
54886280        END;
54886285        % Determine region of the row to use.
54886290        IF StreamWFS THEN
54886295        BEGIN
54886300            UB:=MIN(UB,
54886305                    (ROW+1)*ROWSECTORS,
54886310                    SHAREDBUFFULTIMATEFILEBOUND(POOL));
54886315            IF UB-BLOCKCOUNT GEQ SHAREDBUFFMAXSECTORS(POOL) THEN
54886320            BEGIN
54886325                LEN:=SHAREDBUFFMAXSECTORS(POOL);
54886330            END ELSE
54886335            BEGIN
54886340                BLOCKCOUNT:=MAX(LB,
54886345                                ROW*ROWSECTORS,
54886350                                UB-SHAREDBUFFMAXSECTORS(POOL));
54886355                LEN:=UB-BLOCKCOUNT;
54886360            END;
54886365        END ELSE
54886370        BEGIN
54886375            LEN:=MIN(BLOCKCOUNT+SHAREDBUFFMAXSECTORS(POOL),
54886380                    (ROW+1)*ROWSECTORS,
54886385                    SHAREDBUFFULTIMATEFILEBOUND(POOL)      )-BLOCKCOUNT;
54886390        END;
54886395        SHAREDBUFFFILEADDRESS(POOL,INX):=BLOCKCOUNT;
54886400        SHAREDBUFFSECTORS(POOL,INX):=LEN;
54886405        SHAREDBUFFASSIGNED(POOL,INX):=TRUE;
54886410        SHAREDBUFFNEEDRESETFLAGS(POOL,INX):=0;
54886415        % The buffer has been marked valid.  Do not invoke ERROR after
54886420        % this point.
54886425        % Zero buffer and/or prepare to start read for buffer.
54886430        ROWAD:=ROWADDRESSWORD(DHEADER,ROW);
54886435        IF NOT BOOLEAN(ROWAD.ALLOCATEDROWF) THEN
54886440        BEGIN
54886445            % Region is in unallocated row.
54886450            % Zero the entire buffer.
54886455            LEN:=0;
54886460        END ELSE
54886465        IF BLOCKCOUNT+LEN LEQ SHAREDBUFFCURRENTFILEBOUND(POOL) THEN
54886470        BEGIN
54886475            % Region entirely within the current file bound.
54886480            % Read the entire buffer.
54886485        END ELSE
54886490        IF BLOCKCOUNT GEQ SHAREDBUFFCURRENTFILEBOUND(POOL) THEN
54886495        BEGIN
54886500            % Region entirely beyond the current file bound.
54886505            % Zero the entire buffer.
54886510            LEN:=0;
54886515        END ELSE
54886520        BEGIN
54886525            ARRAY REFERENCE BUFF[0];
54886530            REAL            I;
54886535
54886540            % Region spans the current file bound.
54886545            % Zero the entire buffer, then read beginning of the buffer.
54886550            BUFF:=SHAREDBUFFBUFFER(POOL,INX);
```

```
54886555            REPLACE POINTER(BUFF[0]) BY 0 FOR
54886560              SHAREDBUFFSECTORS(POOL,INX)*BYTES_PER_SECTOR;
54886565            IF PROTECTED(DHEADER) THEN
54886570            BEGIN
54886575                FOR I:=0 STEP 1 UNTIL SHAREDBUFFSECTORS(POOL,INX)-1 DO
54886580                    REPLACE POINTER(BUFF[I*WORDS_PER_SECTOR]) BY
54886585                            POINTER(BINARYEOF) FOR
54886590                            MIN(BYTES_PER_SECTOR,BENDLEN*BYTESPERWORD);
54886595            END;
54886600            LEN:=SHAREDBUFFCURRENTFILEBOUND(POOL)-BLOCKCOUNT;
54886605            SHAREDBUFFSHORTREAD(POOL,INX):=TRUE;
54886610            % SHAREDBUFFWAIT must force full length in LRD.
54886615        END;
54886620        IF LEN EQL 0 THEN
54886625        BEGIN
54886630            ARRAY REFERENCE BUFF[0];
54886635            REAL           I;
54886640
54886645            BUFF:=SHAREDBUFFBUFFER(POOL,INX);
54886650            REPLACE POINTER(BUFF[0]) BY 0 FOR
54886655              SHAREDBUFFSECTORS(POOL,INX)*BYTES_PER_SECTOR;
54886660            IF PROTECTED(DHEADER) AND
54886665               BLOCKCOUNT GEQ SHAREDBUFFCURRENTFILEBOUND(POOL) THEN
54886670            BEGIN
54886675                FOR I:=0 STEP 1 UNTIL SHAREDBUFFSECTORS(POOL,INX)-1 DO
54886680                    REPLACE POINTER(BUFF[I*WORDS_PER_SECTOR]) BY
54886685                            POINTER(BINARYEOF) FOR
54886690                            MIN(BYTES_PER_SECTOR,BENDLEN*BYTESPERWORD);
54886695            END;
54886700            SHAREDBUFFIOSCOMPLETED(POOL,INX):=1;
54886705            SHAREDBUFFLRD(POOL,INX):=
54886710              0 & (SHAREDBUFFSECTORS(POOL,INX)*WORDS_PER_SECTOR)
54886715                  LRDUNITSTRANSFERREDF;
54886720        END ELSE
54886725        BEGIN
54886730            SHAREDBUFFIOSCOMPLETED(POOL,INX):=0;
54886735        END;
54886740        FOUND:
54886745        IOAREA[BUFFPOOLINX]:=INX;
54886750        SHAREDBUFFUSERS(POOL,INX):=*+1;
54886755        ACTUALBLOCK:=SHAREDBUFFFILEADDRESS(POOL,INX);
54886760        DESCRIPTOR AT IOAREA[PIOBUFFDESC]:=SHAREDBUFFBUFFER(POOL,INX);
54886765        SectorsInBuffer:=SHAREDBUFFSECTORS(POOL,INX);
54886770        DataLengthValue:=SectorsInBuffer*EXTFRAMES_PER_SECTOR;
54886775        BufferShortened:=FALSE;
54886780        BufferSizingControl:=USizingV;
54886785        IF CRUNCHED(DHEADER) CAND
54886790           ACTUALBLOCK+SectorsInBuffer GTR DSKEOFV(DHEADER) THEN
54886795        BEGIN
54886800            % Prevent writing to the unused portion of
54886805            % the last sector of a crunched file.
54886810            ASSERT(DSKEOFU(DHEADER) GTR 0);
54886815            ASSERT(ACTUALBLOCK+SectorsInBuffer EQL DSKEOFV(DHEADER)+1);
54886820            DataLengthValue:=*-((BITS_PER_SECTOR-DSKEOFU(DHEADER)) DIV
54886825                               BITS_PER_EXTFRAME);
54886830        END ELSE
54886835        IF ROWTAIL(DHEADER) GTR 0 CAND
54886840           ACTUALBLOCK+SectorsInBuffer EQL (ROW+1)*ROWSECTORS THEN
54886845        BEGIN
54886850            DataLengthValue:=*-BYTES_TO_EXTFRAMES(ROWTAIL(DHEADER));
54886855        END;
54886860        IF Aligned180WFS THEN
54886865        BEGIN
54886870            DataLengthValue:=MIN(DataLengthValue,BLOCKSZ);
54886875        END ELSE
54886880        IF BlockedWFS THEN
54886885        BEGIN
54886890            DataLengthValue:=MIN(DataLengthValue,
54886895                                 BLOCK_BOUNDARY(DataLengthValue-1));
```

```
54886900            END;
54886905            IOAREA[IOSCOMPLETEDTARGET]:=1;
54886910            IF SHAREDBUFFIOSCOMPLETED(POOL,INX) GTR 0 THEN
54886915            BEGIN
54886920                IOAREA[IOAW].IOOUTSTANDINGF:=0;
54886925                IF BOOLEAN(SHAREDBUFFLRD(POOL,INX)) THEN
54886930                BEGIN
54886935                    % Last gasp.  If someone has issued a write, maybe
54886940                    % it has completed successfully and we can let the
54886945                    % user see the area.
54886950                    IF SHAREDBUFFWRITEOUTSTANDING(POOL,INX) CAND
54886955                        HAPPENED(SHAREDBUFFEVENT(POOL,INX)) THEN
54886960                    BEGIN
54886965                        SHAREDWRITEEPILOG(POOL,INX);
54886970                    END;
54886975                END;
54886980                IOAREA[IOCBDESC]:=SHAREDBUFFLRD(POOL,INX);
54886985            END ELSE
54886990            BEGIN
54886995                IOAREA[IOAW].IOOUTSTANDINGF:=1;
54887000                IOAREA[IOCBDESC]:=0;
54887005            END;
54887010            IF LEN GTR 0 THEN
54887015            BEGIN
54887020                % Ready to issue read.
54887025                IF NOT BOOLEAN(ROWAD.ACTIVEROWF) THEN
54887030                BEGIN
54887035                    RESET(SHAREDBUFFEVENT(POOL,INX));
54887040                    % It is OK to unlock the shared buffer pool now.
54887045                    % Any other potential user of this buffer will
54887050                    % wait for the data to be marked valid because:
54887055                    %   SHAREDBUFFIOSCOMPLETED(POOL,INX) EQL 0
54887060                    %   SHAREDBUFFEVENT(POOL,INX) has not HAPPENED
54887065                    %   SHAREDBUFFUSERS(POOL,INX) GTR  0
54887070                    UNLOCKSHAREDBUFFERPOOL;
54887075                    ROWAD:=GETUSERDISK(DHEADER,ROW);
54887080                    LOCKSHAREDBUFFERPOOL;
54887085                END;
54887090                IF NOT BOOLEAN(ROWAD.ACTIVEROWF) THEN
54887095                BEGIN
54887100                    % We were probably DSed out of a missing pack RSVP
54887105                    % from GETUSERDISK.
54887110                    % Make it look like the read failed.
54887115                    % (We cannot use ERROR, as other stacks may have picked
54887120                    % up this buffer when we used UNLOCKSHAREDBUFFERPOOL.)
54887125                    SHAREDBUFFIOSCOMPLETED(POOL,INX):=1;
54887130                    SHAREDBUFFLRD(POOL,INX):=LIOLRDCANCELV;
54887135                    CAUSE(SHAREDBUFFEVENT(POOL,INX));
54887140                END ELSE
54887145                BEGIN
54887150                    REAL IOCW,
54887155                         LU;
54887160
54887165                    IF NOT SHAREDBUFFIOCBALLOCATED(POOL,INX) THEN
54887170                    BEGIN
54887175                        BUILDIOCB(SHAREDBUFFIOCB(POOL,INX),
54887180                                  USERIO,
54887185                                  MCPSTACK,
54887190                                  TRUE);
54887195                        SETUPWORDIOCB(SHAREDBUFFIOCB(POOL,INX),
54887200                                      SHAREDBUFFEVENT(POOL,INX),
54887205                                      DESCRIPTOR(FIB),
54887210                                      0,
54887215                                      SHAREDBUFFBUFFER(POOL,INX),
54887220                                      0,
54887225                                      1);
54887230                        SHAREDBUFFIOCBALLOCATED(POOL,INX):=TRUE;
54887235                    END;
54887240                    % Bill the owner of the FIB which is issuing this IO.
```

```
54887245              % This is safe because we have set
54887250              % IOAREA[IOAW].IOOUTSTANDINGF in this FIB, which will
54887255              % cause SHAREDBUFFWAIT to be invoked before this FIB
54887260              % is deallocated.
54887280              SETIOCBOWNERSHIPANDLENGTH(SHAREDBUFFIOCB(POOL,INX),
54887285                                        DESCRIPTOR(FIB),
54887295                                        FIBOWNER,
54887310                                        LEN*WORDS_PER_SECTOR);
54887315              IOCW:=0 & DISKREAD                          IOSTANDARDFIELD
54887320                    & (ROWAD.SEGADDRESSF+
54887325                       (BLOCKCOUNT MOD ROWSECTORS))  IOUNITFIELD;
54887330              LU:=FAMINDEXUNIT(BASEUNIT(DHEADER),ROWAD.FAMILYINDEXF);
54887335              IF CHECKIOADDRESSRANGE(IOCW,
54887340                                     LEN,
54887345                                     LU,
54887350                                     DHEADER) THEN
54887355              BEGIN
54887360                 RESET(SHAREDBUFFEVENT(POOL,INX));
54887365                 INITIATEUSERPSEUDOIO(SHAREDBUFFIOCB(POOL,INX),
54887370                                      LIOLRD(OUTOFRANGEAV));
54887375              END ELSE
54887380              IF NOT BLOCKED CAND
54887385                 (FILESTATE EQL WRITESSTATE OR
54887390                  FILESTATE EQL WRITENSTATE   ) CAND
54887395                 SectorsInBuffer EQL SEGPERBLK THEN
54887400              BEGIN
54887405                 RESET(SHAREDBUFFEVENT(POOL,INX));
54887410                 IOAREA[IOAW].IOOUTSTANDINGF:=0;
54887415                 IOAREA[IOAW].WAITINGFORDATAF:=1;
54887420                 IOAREA[IOCBDESC]:=
54887425                     0 & (LEN*WORDS_PER_SECTOR) LRDUNITSTRANSFERREDF;
54887430              END ELSE
54887435              BEGIN
54887440                 % RESET(SHAREDBUFFEVENT(POOL,INX));
54887445                 % DONE BY INITIATEUSERDISKIO.
54887450                 INITIATEUSERDISKIO(SHAREDBUFFIOCB(POOL,INX),
54887455                                    IOCW,
54887460                                    LU,
54887465                                    SHAREDBUFFEVENT(POOL,INX));
54887470              END;
54887475           END;
54887480        END;
54887485        DONE:
54887490        UNLOCKSHAREDBUFFERPOOL;
54887495     END ASSOCIATESHAREDBUFFERP;
```

```
INITIATESHAREDWRITEP OF FIBSTACK OF <LOGICALIO> OF <SOFTIO>   ::   REAL PROCEDURE
       @ (1,A4)   ::   DECLARED @ 54888100    ENDS @ 54889710    FORWARD @ 54215080

54888100    REAL PROCEDURE INITIATESHAREDWRITEP;
54888105    BEGIN
54888110        ARRAY REFERENCE POOL[0];
54888115        REAL            INX,
54888120                        ROWSECTORS,
54888125                        ROW,
54888130                        ROWAD,
54888135                        IOCW,
54888140                        LU;
54888145        BOOLEAN         PREVIOUSLYALLOCATED,
54888150                        SCRUBNEEDED,
54888155                        RESETEOFSCRUBBED;
54888160        LABEL           DONE;
54888165        DEFINE           COUNTNEEDED =
54888170                        (DISKLIMITSET(SNR) AND
54888175                           NOT (FILEKIND(DHEADER)=BACKUPPRINTER OR
54888180                                FILEKIND(DHEADER)=BACKUPPUNCH)) #;
54888185        DEFINE ERROR(LRD) =
54888190        BEGIN
54888195           IOAREA[IOAW].IOOUTSTANDINGF:=0;
54888200           IOAREA[IOCBDESC]:=(LRD);
54888205           INITIATESHAREDWRITEP:=(LRD);
54888210           GO DONE;
54888215        END #;
54888220
54888225        LOCKSHAREDBUFFERPOOL;
54888230        POOL:=SHAREDBUFFPOOL[UNITNUMBER,*];
54888235        INX:=IOAREA[BUFFPOOLINX];
54888236        IF SHAREDBUFFIOSCOMPLETED(POOL,INX) EQL 0 THEN
54888237        BEGIN
54888238           % The data in the buffer is not valid.  This should never
54888239           % occur.  Do not issue the write.
54888240           ASSERT(FALSE);
54888241           ERROR(LIOLRDCANCELV);
54888242        END;
54888245        IF SHAREDBUFFIOSCOMPLETED(POOL,INX) GEQ
54888250           IOAREA[IOSCOMPLETEDTARGET] THEN
54888255        BEGIN
54888260           IF NOT BOOLEAN(SHAREDBUFFLRD(POOL,INX)) COR
54888265              IOAREA[IOSCOMPLETEDTARGET] EQL 1 THEN
54888270           BEGIN
54888275              % If IOSCOMPLETEDTARGET EQL 1, this FIB has not modified
54888280              % the buffer and should not write it, even if it was
54888285              % read with an error.
54888290              IOAREA[IOAW].IOOUTSTANDINGF:=0;
54888295              IOAREA[IOCBDESC]:=SHAREDBUFFLRD(POOL,INX);
54888300              GO DONE;
54888305           END;
54888310           IOAREA[IOSCOMPLETEDTARGET]:=
54888315              SHAREDBUFFIOSCOMPLETED(POOL,INX)+1;
54888320        END;
54888325        ASSERT(IOAREA[IOSCOMPLETEDTARGET] EQL
54888330              SHAREDBUFFIOSCOMPLETED(POOL,INX)+1);
54888335        IOAREA[IOAW].IOOUTSTANDINGF:=1;
54888340        IOAREA[IOCBDESC]:=0;
54888345        IF SHAREDBUFFWRITEOUTSTANDING(POOL,INX) THEN
54888350           GO DONE;
54888355        IF SHAREDBUFFSCRUBFAILED(POOL) CAND
54888360           SHAREDBUFFFILEADDRESS(POOL,INX)+SHAREDBUFFSECTORS(POOL,INX) GTR
54888365              SHAREDBUFFULTIMATEFILEBOUND(POOL) THEN
54888370           ERROR(LIOLRD(DISKALLOCATIONFAILEDAV));
54888375        ROWSECTORS:=ROWSIZE(DHEADER);
54888380        ROW:=SHAREDBUFFFILEADDRESS(POOL,INX) DIV ROWSECTORS;
54888385        ROWAD:=ROWADDRESSWORD(DHEADER,ROW);
54888390        IF NOT BOOLEAN(ROWAD.ACTIVEROWF) THEN
54888395        BEGIN
```

```
54888400        PREVIOUSLYALLOCATED:=BOOLEAN(ROWAD.ALLOCATEDROWF);
54888405        SCRUBNEEDED:=
54888410         NOT PREVIOUSLYALLOCATED CAND
54888415          (SHAREDBUFFFULLSCRUB(POOL) OR
54888420           (SHAREDBUFFOPTIMIZEDSCRUB(POOL) AND
54888425            ROW*ROWSECTORS LSS SHAREDBUFFCURRENTFILEBOUND(POOL)));
54888430        RESETEOFSCRUBBED:=
54888435         DELAYSCRUB CAND
54888440         NOT PREVIOUSLYALLOCATED CAND
54888445         NOT SCRUBNEEDED;
54888450        UNLOCKSHAREDBUFFERPOOL;
54888455        IF NOT PREVIOUSLYALLOCATED CAND
54888460            FILESATURATION CAND
54888465            ROW EQL NUMBEROFROWS(DHEADER)-1 CAND
54888470            (NOT FLEXIBLEFILE OR ROW EQL MAXNUMBEROFROWSV-1) THEN
54888475              MESSER (MSRHDR3, DHEADER);   % WARNING, LAST ROW
54888480        IF RESETEOFSCRUBBED THEN
54888485            ACQUIREFILEHEADER(UNITNUMBER);
54888490        IF DRCING THEN
54888495        BEGIN
54888500            ROWAD:=
54888505             DRCGETUSERDISK(DHEADER,
54888510                            ROW & REAL(COUNTNEEDED)  COUNTBITF
54888515                                & REAL(SCRUBNEEDED)  SCRUBITF
54888520                                & (NORESOURCEWAIT)   RBITF
54888525                                & (CHECKLIMITS)      GUDCHECKLIMITSF);
54888530        END ELSE
54888535        BEGIN
54888540            ROWAD:=
54888545             GETUSERDISK(DHEADER,
54888550                         ROW & REAL(COUNTNEEDED)  COUNTBITF
54888555                             & REAL(SCRUBNEEDED)  SCRUBITF
54888560                             & (NORESOURCEWAIT)   RBITF);
54888565        END;
54888570        IF RESETEOFSCRUBBED AND
54888575            BOOLEAN(ROWAD.ACTIVEROWF) THEN
54888580              SETEOFSCRUBBED(DHEADER,FALSE);
54888585        IF RESETEOFSCRUBBED THEN
54888590            UNLOCKFILEHEADER(UNITNUMBER);
54888595        LOCKSHAREDBUFFERPOOL;
54888600        IF NOT BOOLEAN(ROWAD.ACTIVEROWF) THEN
54888605        BEGIN
54888610            IF ROWAD EQL FAMILYLIMITERRORV THEN
54888615            BEGIN
54888620               % Disk Resource Control limit
54888625               ERROR(LIOLRD(FAMILYLIMITERRAV));
54888630            END ELSE
54888635            IF ROWAD EQL INTEGRALLIMITERRORV THEN
54888640            BEGIN
54888645               % DRC limit
54888650               ERROR(LIOLRD(INTEGRALLIMITERRAV));
54888655            END ELSE
54888660            IF ROWAD EQL TEMPFILELIMITERRORV THEN
54888665            BEGIN
54888670               % DRC limit
54888675               ERROR(LIOLRD(TEMPFILEEXCEEDEDAV));
54888680            END ELSE
54888685            BEGIN
54888690               % GETUSERDISK error:  if NORESOURCEWAIT, the
54888695               % result has the EOT bit on.  Otherwise,
54888700               % the result has EOT bit off.
54888705               IF BOOLEAN(NORESOURCEWAIT) THEN
54888710               BEGIN
54888715                   ERROR(LIOLRD(INSUFFICIENTSPACEAV));
54888720               END ELSE
54888725               BEGIN
54888730                   ERROR(LIOLRD(DISKALLOCATIONFAILEDAV));
54888735               END;
54888740            END;
```

```
54888745              END;
54888750          IF NOT PREVIOUSLYALLOCATED THEN
54888755          BEGIN
54888760              SEGINT:=*+SEGUSAGE.SEGUSAGEF*(CLOCK-SEGCLOCK)*
54888765                      CLICKSTOSECONDSV;
54888770              SEGUSAGE.SEGUSAGEF:=*+ROWSECTORS;
54888775              SEGCLOCK:=CLOCK;
54888780              TIMESTAMPANDUPDATEHEADER(DHEADER);
54888785              IF SHAREDBUFFFILEADDRESS(POOL,INX) GEQ
54888790                  SHAREDBUFFCURRENTFILEBOUND(POOL) THEN
54888795              BEGIN
54888800                  IOAREA[IOAW].FORCESYNCDSKEOF:=1;
54888805                  % Don't move DSKEOF into this row until this write
54888810                  % has successfully completed.
54888815              END;
54888820              % SCRUB_EOF_ROW must scrub rows beyond DSKEOF to cover
54888825              % the case where the system halt loads before
54888830              % SHAREDBUFFWAITP moves DSKEOF into this row.
54888835          END;
54888840          IF SHAREDBUFFIOSCOMPLETED(POOL,INX)+
54888845              REAL(SHAREDBUFFWRITEOUTSTANDING(POOL,INX)) GEQ
54888850              IOAREA[IOSCOMPLETEDTARGET] THEN
54888855          BEGIN
54888860              % Someone else issued the write while we had the
54888865              % buffer pool unlocked.
54888870              GO DONE;
54888875          END;
54888880          ASSERT(NOT SHAREDBUFFWRITEOUTSTANDING(POOL,INX));
54888885      END;
54888890      IF (SHAREDBUFFFILEADDRESS(POOL,INX)+
54888895          SHAREDBUFFSECTORS(POOL,INX)      ) GTR
54888900          SHAREDBUFFCURRENTFILEBOUND(POOL) THEN
54888905      BEGIN
54888910          IF PROTECTED(DHEADER) CAND
54888915              NOT WROTELASTROW(DHEADER) THEN
54888920          BEGIN
54888925              ACQUIREFILEHEADER(UNITNUMBER);
54888930              SETWROTELASTROW(DHEADER,TRUE);
54888935              UNLOCKFILEHEADER(UNITNUMBER);
54888940              IF PERMANENT(DHEADER) CAND
54888945                  RELEASEHEADER(DHEADER,0 & 1 UPDATEDF
54888950                                        & 1 STILLINUSEF) LSS 0 THEN
54888955                  ERROR(LIOLRDCANCELV);
54888960          END;
54888965          IF SHAREDBUFFOPTIMIZEDSCRUB(POOL) THEN
54888970          BEGIN
54888975              IF SHAREDBUFFCURRENTFILEBOUND(POOL) LSS
54888980                  SHAREDBUFFFILEADDRESS(POOL,INX) THEN
54888985              BEGIN
54888990                  REAL INX2,
54888995                       FOUNDINX,
54889000                       XROW,
54889005                       XROWAD,
54889010                       START,
54889015                       LEN;
54889020
54889025                  DO
54889030                  BEGIN
54889035                      FOUNDINX:=-1;
54889040                      INX2:=SHAREDBUFFMAXINX(POOL);
54889045                      DO
54889050                      BEGIN
54889055                          IF SHAREDBUFFUSERS(POOL,INX2) GTR 0 CAND
54889060                              SHAREDBUFFFILEADDRESS(POOL,INX2) EQL
54889065                                  SHAREDBUFFCURRENTFILEBOUND(POOL) THEN
54889070                              FOUNDINX:=INX2;
54889075                          INX2:=*-1;
54889080                      END UNTIL INX2 LSS 0 OR
54889085                              FOUNDINX NEQ -1;
```

```
54889090                    IF FOUNDINX NEQ -1 THEN
54889095                    BEGIN
54889100                        ASSERT(SHAREDBUFFIOSCOMPLETED(POOL,
54889105                                        FOUNDINX) EQL 1 AND
54889110                              NOT SHAREDBUFFWRITEOUTSTANDING(POOL,
54889115                                        FOUNDINX));
54889120                        XROW:=SHAREDBUFFCURRENTFILEBOUND(POOL) DIV
54889125                                ROWSECTORS;
54889130                        XROWAD:=ROWADDRESSWORD(DHEADER,XROW);
54889135                        IF BOOLEAN(XROWAD.ALLOCATEDROWF) THEN
54889140                        BEGIN
54889145                            IF NOT BOOLEAN(XROWAD.ACTIVEROWF) THEN
54889150                            BEGIN
54889155                                XROWAD:=GETUSERDISK(DHEADER,XROW);
54889160                                IF NOT BOOLEAN(XROWAD.ACTIVEROWF) THEN
54889165                                    ERROR(
54889170                                        LIOLRD(DISKALLOCATIONFAILEDAV));
54889175                            END;
54889180                            SHAREDBUFFMUSTBEWRITTEN(POOL,FOUNDINX):=
54889185                              TRUE;
54889190                            % Note: Only set when row is allocated.
54889195                            %       Also, we have activated the row.
54889200                        END;
54889205                        SHAREDBUFFCURRENTFILEBOUND(POOL):=*+
54889210                          SHAREDBUFFSECTORS(POOL,FOUNDINX);
54889215                    END;
54889220                END UNTIL FOUNDINX EQL -1 OR
54889225                            SHAREDBUFFCURRENTFILEBOUND(POOL) GEQ
54889230                            SHAREDBUFFFILEADDRESS(POOL,INX);
54889235                WHILE SHAREDBUFFCURRENTFILEBOUND(POOL) LSS
54889240                    SHAREDBUFFFILEADDRESS(POOL,INX) DO
54889245                BEGIN
54889250                    XROW:=SHAREDBUFFCURRENTFILEBOUND(POOL) DIV
54889255                            ROWSECTORS;
54889260                    START:=SHAREDBUFFCURRENTFILEBOUND(POOL) MOD
54889265                            ROWSECTORS;
54889270                    LEN:=MIN(ROWSECTORS-START,
54889275                                SHAREDBUFFFILEADDRESS(POOL,INX)-
54889280                                SHAREDBUFFCURRENTFILEBOUND(POOL));
54889285                    XROWAD:=ROWADDRESSWORD(DHEADER,XROW);
54889290                    IF BOOLEAN(XROWAD.ALLOCATEDROWF) THEN
54889295                    BEGIN
54889300                        IF NOT BOOLEAN(XROWAD.ACTIVEROWF) THEN
54889305                        BEGIN
54889310                            XROWAD:=GETUSERDISK(DHEADER,XROW);
54889315                            IF NOT BOOLEAN(XROWAD.ACTIVEROWF) THEN
54889320                                ERROR(LIOLRD(DISKALLOCATIONFAILEDAV));
54889325                        END;
54889330                        IF SCRUBDISK(XROWAD.SEGADDRESSF+START,
54889335                                    LEN,
54889340                                    FAMINDEXUNIT(BASEUNIT(DHEADER),
54889345                                        XROWAD.FAMILYINDEXF)) THEN
54889350                        BEGIN
54889355                            % Disk scrub failed.
54889360                            SHAREDBUFFSCRUBFAILED(POOL):=TRUE;
54889365                            SHAREDBUFFULTIMATEFILEBOUND(POOL):=
54889370                              SHAREDBUFFCURRENTFILEBOUND(POOL);
54889375                            ERROR(LIOLRD(DISKALLOCATIONFAILEDAV));
54889380                        END;
54889385                    END;
54889390                    SHAREDBUFFCURRENTFILEBOUND(POOL):=*+LEN;
54889395                END;
54889400            END;
54889405            SHAREDBUFFMUSTBEWRITTEN(POOL,INX):=TRUE;
54889410        END;
54889415        SHAREDBUFFCURRENTFILEBOUND(POOL):=
54889420          SHAREDBUFFFILEADDRESS(POOL,INX)+SHAREDBUFFSECTORS(POOL,INX);
54889425    END;
54889430    IF NOT SHAREDBUFFIOCBALLOCATED(POOL,INX) THEN
```

```
54889435            BEGIN
54889440                BUILDIOCB(SHAREDBUFFIOCB(POOL,INX),
54889445                          USERIO,
54889450                          MCPSTACK,
54889455                          TRUE);
54889460                SETUPWORDIOCB(SHAREDBUFFIOCB(POOL,INX),
54889465                              SHAREDBUFFEVENT(POOL,INX),
54889470                              DESCRIPTOR(FIB),
54889475                              0,
54889480                              SHAREDBUFFBUFFER(POOL,INX),
54889485                              0,
54889490                              1);
54889495                SHAREDBUFFIOCBALLOCATED(POOL,INX):=TRUE;
54889500            END;
54889505            % Bill the owner of the FIB which is issuing this IO.
54889510            % This is safe because we have set
54889515            % IOAREA[IOAW].IOOUTSTANDINGF in this FIB, which will
54889520            % cause SHAREDBUFFWAIT to be invoked before this FIB
54889525            % is deallocated.
54889530            SETIOCBOWNERSHIPANDLENGTH(SHAREDBUFFIOCB(POOL,INX),
54889540                                      DESCRIPTOR(FIB),
54889550                                      FIBOWNER,
54889575                                      SHAREDBUFFSECTORS(POOL,INX)*
54889580                                      WORDS_PER_SECTOR);
54889585            IOCW:=0 & DISKWRITE                             IOSTANDARDFIELD
54889590                & (ROWAD.SEGADDRESSF+
54889595                   (SHAREDBUFFFILEADDRESS(POOL,INX) MOD
54889600                    ROWSECTORS                          )) IOUNITFIELD;
54889605            LU:=FAMINDEXUNIT(BASEUNIT(DHEADER),ROWAD.FAMILYINDEXF);
54889610            IF CHECKIOADDRESSRANGE(IOCW,
54889615                                   SHAREDBUFFSECTORS(POOL,INX),
54889620                                   LU,
54889625                                   DHEADER) THEN
54889630            BEGIN
54889635                RESET(SHAREDBUFFEVENT(POOL,INX));
54889640                INITIATEUSERPSEUDOIO(SHAREDBUFFIOCB(POOL,INX),
54889645                                     LIOLRD(OUTOFRANGEAV));
54889650            END ELSE
54889655            BEGIN
54889660                % RESET(SHAREDBUFFEVENT(POOL,INX));
54889665                % DONE BY INITIATEUSERDISKIO.
54889670                INITIATEUSERDISKIO(SHAREDBUFFIOCB(POOL,INX),
54889675                                   IOCW,
54889680                                   LU,
54889685                                   SHAREDBUFFEVENT(POOL,INX));
54889690            END;
54889695            SHAREDBUFFWRITEOUTSTANDING(POOL,INX):=TRUE;
54889700        DONE:
54889705            UNLOCKSHAREDBUFFERPOOL;
54889710        END INITIATESHAREDWRITEP;
```

SHAREDBUFFWAITP OF FIBSTACK OF <LOGICALIO> OF <SOFTIO>   ::   PROCEDURE @ (1,A3)   ::
        DECLARED @ 54887795     ENDS @ 54888090     FORWARD @ 54215000

```
54887795        PROCEDURE SHAREDBUFFWAITP(IOAREA,MYIO);
54887800        VALUE   MYIO;
54887805        ARRAY   IOAREA[0];
54887810        BOOLEAN MYIO;
54887815        BEGIN
54887820            ARRAY REFERENCE POOL[0];
54887825            REAL              INX;
54887830
54887835            IF MYIO THEN
54887840                LOCKSHAREDBUFFERPOOL;
54887845            POOL:=SHAREDBUFFPOOL[UNITNUMBER,*];
54887850            INX:=IOAREA[BUFFPOOLINX];
54887855            IF NOT MYIO COR
54887860                SHAREDBUFFIOSCOMPLETED(POOL,INX) LSS
54887865                IOAREA[IOSCOMPLETEDTARGET] THEN
54887870            BEGIN
54887875                IF NOT HAPPENED(SHAREDBUFFEVENT(POOL,INX)) THEN
54887880                BEGIN
54887885                    UNLOCKSHAREDBUFFERPOOL;
54887890                    IF HDUMACHINE THEN
54887895                        IOINPROCESS(SHAREDBUFFIOCB(POOL,INX));
54887900                    WAIT(SHAREDBUFFEVENT(POOL,INX));
54887905                    LOCKSHAREDBUFFERPOOL;
54887910                END;
54887915                IF HAPPENED(SHAREDBUFFEVENT(POOL,INX)) THEN
54887920                BEGIN
54887925                    IF SHAREDBUFFIOSCOMPLETED(POOL,INX) EQL 0 THEN
54887930                    BEGIN
54887935                        % Just finished a read.
54887940                        SHAREDBUFFIOSCOMPLETED(POOL,INX):=*+1;
54887945                        SHAREDBUFFLRD(POOL,INX):=
54887950                          GETLOGICALRESULT(SHAREDBUFFIOCB(POOL,INX));
54887955                        IF SHAREDBUFFSHORTREAD(POOL,INX) AND
54887960                            NOT BOOLEAN(SHAREDBUFFLRD(POOL,INX)) THEN
54887965                              SHAREDBUFFLRD(POOL,INX).LRDUNITSTRANSFERREDF:=
54887970                                (SHAREDBUFFSECTORS(POOL,INX)*WORDS_PER_SECTOR);
54887975                    END ELSE
54887980                    IF SHAREDBUFFWRITEOUTSTANDING(POOL,INX) THEN
54887985                    BEGIN
54887990                        % Just finished a write.
54887995                        SHAREDWRITEEPILOG(POOL,INX);
54888000                    END;
54888005                END;
54888010            END;
54888015            IF MYIO THEN
54888020            BEGIN
54888025                ASSERT(SHAREDBUFFIOSCOMPLETED(POOL,INX) GEQ
54888030                        IOAREA[IOSCOMPLETEDTARGET]);
54888035                IOAREA[IOCBDESC]:=SHAREDBUFFLRD(POOL,INX);
54888040                UNLOCKSHAREDBUFFERPOOL;
54888045                IF BOOLEAN(IOAREA[IOAW].FORCESYNCDSKEOF) THEN
54888050                BEGIN
54888055                    IOAREA[IOAW].FORCESYNCDSKEOF:=0;
54888060                    FLOAT(SHAREDBUFFSYNCDSKEOFP);
54888065                    IF SHAREDBUFFSYNCDSKEOF CAND
54888070                        NOT BOOLEAN(IOAREA[IOCBDESC]) THEN
54888075                        IOAREA[IOCBDESC]:=LIOLRDCANCELV;
54888080                END;
54888085            END;
54888090        END SHAREDBUFFWAITP;
```

SHAREDWRITEEPILOG OF FIBSTACK OF <LOGICALIO> OF <SOFTIO>  :: DEFINE  ::
        DECLARED @ 54885235    ENDS @ 54885330

```
54885235    DEFINE SHAREDWRITEEPILOG(POOL,INX) =
54885240    BEGIN
54885245        SHAREDBUFFWRITEOUTSTANDING(POOL,INX):=FALSE;
54885250        SHAREDBUFFIOSCOMPLETED(POOL,INX):=*+1;
54885255        SHAREDBUFFLRD(POOL,INX):=
54885260         GETLOGICALRESULT(SHAREDBUFFIOCB(POOL,INX));
54885265        IF SHAREDBUFFMUSTBEWRITTEN(POOL,INX) THEN
54885270        BEGIN
54885275            SHAREDBUFFMUSTBEWRITTEN(POOL,INX):=FALSE;
54885280            IF BOOLEAN(SHAREDBUFFLRD(POOL,INX)) THEN
54885285            BEGIN
54885290                SHAREDBUFFSCRUBFAILED(POOL):=TRUE;
54885295                SHAREDBUFFCURRENTFILEBOUND(POOL):=
54885300                 MIN(SHAREDBUFFCURRENTFILEBOUND(POOL),
54885305                     SHAREDBUFFFILEADDRESS(POOL,INX));
54885310                SHAREDBUFFULTIMATEFILEBOUND(POOL):=
54885315                    SHAREDBUFFCURRENTFILEBOUND(POOL);
54885320            END;
54885325        END;
54885330    END #;
```

```
DISASSOCIATESHAREDBUFFERP OF FIBSTACK OF <LOGICALIO> OF <SOFTIO>  ::  PROCEDURE
        @ (1,A1)  ::  DECLARED @ 54887505    ENDS @ 54887715    FORWARD @ 54214960

54887505    PROCEDURE DISASSOCIATESHAREDBUFFERP;
54887510    BEGIN
54887515        ARRAY REFERENCE POOL[0];
54887520        REAL            INX;
54887525
54887530        LOCKSHAREDBUFFERPOOL;
54887535        POOL:=SHAREDBUFFPOOL[UNITNUMBER,*];
54887540        INX:=IOAREA[BUFFPOOLINX];
54887600        DISASSOCIATESHAREDBUFFERBODY(POOL,INX);
54887710        UNLOCKSHAREDBUFFERPOOL;
54887715    END DISASSOCIATESHAREDBUFFERP;
```

```
DISASSOCIATESHAREDBUFFERBODY OF FIBSTACK OF <LOGICALIO> OF <SOFTIO>  ::  INLINE
     PROCEDURE  ::  DECLARED @ 54885416    ENDS @ 54885494

54885416    PROCEDURE DISASSOCIATESHAREDBUFFERBODY(POOL,INX);
54885418    NAME  INX;
54885420    ARRAY POOL[0];
54885422    REAL  INX;
54885424    BEGIN  [ INLINE ]
54885426
54885428        IF (SHAREDBUFFUSERS(POOL,INX):=*-1) EQL 0 THEN
54885430        BEGIN
54885432            IF SHAREDBUFFMUSTBEWRITTEN(POOL,INX) THEN
54885434                SCRUBUNDERBUFFER(POOL,INX,TRUE);
54885436            IF BOOLEAN(SHAREDBUFFLRD(POOL,INX)) OR
54885438                BOOLEAN(IOAREA[IOAW].WAITINGFORDATAF) THEN
54885440            BEGIN
54885442                SHAREDBUFFASSIGNED(POOL,INX):=FALSE;
54885444                IOAREA[IOAW].WAITINGFORDATAF:=0;
54885446            END;
54885448        END ELSE
54885450        IF BOOLEAN(IOAREA[IOAW].WAITINGFORDATAF) THEN
54885452        BEGIN
54885454            REAL ROWSECTORS,
54885456                 ROWAD,
54885458                 IOCW;
54885460
54885462            ROWSECTORS:=ROWSIZE(DHEADER);
54885464            ROWAD:=ROWADDRESSWORD(DHEADER,
54885466                    SHAREDBUFFFILEADDRESS(POOL,INX) DIV ROWSECTORS);
54885468            IOCW:=0 & DISKREAD                              IOSTANDARDFIELD
54885470                & (ROWAD.SEGADDRESSF+
54885472                    (SHAREDBUFFFILEADDRESS(POOL,INX) MOD
54885474                     ROWSECTORS                  )) IOUNITFIELD;
54885476            INITIATEUSERDISKIO(SHAREDBUFFIOCB(POOL,INX),
54885478                               IOCW,
54885480                               FAMINDEXUNIT(BASEUNIT(DHEADER),
54885482                                            ROWAD.FAMILYINDEXF),
54885484                               SHAREDBUFFEVENT(POOL,INX));
54885486            IOAREA[IOAW].WAITINGFORDATAF:=0;
54885488        END;
54885490        ACTUALBLOCK:=-1;
54885492        DESCRIPTOR AT IOAREA[PIOBUFFDESC]:=EMPTYDESCRIPTOR;
54885494    END DISASSOCIATESHAREDBUFFERBODY;
```

SCRUBUNDERBUFFER OF FIBSTACK OF <LOGICALIO> OF <SOFTIO>  :: DEFINE ::
        DECLARED @ 54885340    ENDS @ 54885412

```
54885340    DEFINE SCRUBUNDERBUFFER(POOL,INX,UNASSIGNONFAIL) =
54885345    BEGIN
54885350        REAL ROWSECTORS,
54885355             ROW,
54885360             ROWAD;
54885362
54885364        % Never got written.  We must scrub the disk space.
54885366        % This should be quite rare.
54885368        SHAREDBUFFMUSTBEWRITTEN(POOL,INX):=FALSE;
54885370        ROWSECTORS:=ROWSIZE(DHEADER);
54885372        ROW:=SHAREDBUFFFILEADDRESS(POOL,INX) DIV ROWSECTORS;
54885374        ROWAD:=ROWADDRESSWORD(DHEADER,ROW);
54885376        ASSERT(BOOLEAN(ROWAD.ACTIVEROWF));
54885378        IF SCRUBDISK(ROWAD.SEGADDRESSF+
54885380                     (SHAREDBUFFFILEADDRESS(POOL,INX) MOD
54885382                       ROWSECTORS                            ),
54885384                     SHAREDBUFFSECTORS(POOL,INX),
54885386                     FAMINDEXUNIT(BASEUNIT(DHEADER),
54885388                                  ROWAD.FAMILYINDEXF)) THEN
54885390        BEGIN
54885392            % Disk scrub failed.
54885394            SHAREDBUFFSCRUBFAILED(POOL):=TRUE;
54885396            SHAREDBUFFCURRENTFILEBOUND(POOL):=
54885398             MIN(SHAREDBUFFCURRENTFILEBOUND(POOL),
54885400                 SHAREDBUFFFILEADDRESS(POOL,INX));
54885402            SHAREDBUFFULTIMATEFILEBOUND(POOL):=
54885404             SHAREDBUFFCURRENTFILEBOUND(POOL);
54885406            IF (UNASSIGNONFAIL) THEN
54885408                SHAREDBUFFASSIGNED(POOL,INX):=FALSE;
54885410        END;
54885412    END #;
```

MODIFYSHAREDBUFFPREFACE OF FIBSTACK OF <LOGICALIO> OF <SOFTIO>  ::   DEFINE   ::
        DECLARED @ 54024610    ENDS @ 54024710

```
54024610        MODIFYSHAREDBUFFPREFACE(SERIALDIAGONAL) =
54024615                    BEGIN
54024620                    LOCK(SHAREDBUFFLOCK(UNITNUMBER));
54024625                    WHILE SHAREDBUFFWRITEOUTSTANDING_HDRX(
54024630                            UNITNUMBER,IOAREA[BUFFPOOLINX]) DO
54024635                        BEGIN
54024640                        FLOAT(SHAREDBUFFWAITP);
54024645                        SHAREDBUFFWAIT(IOAREA,FALSE);
54024650                        END;
54024652                    IF (SERIALDIAGONAL) CAND
54024654                       APPEND THEN
54024656                        BEGIN
54024658                        WHILE RECORDCOUNT+1 NEQ
54024660                                SHAREDBUFFTOTALRECS_HDRX(UNITNUMBER) DO
54024662                            BEGIN
54024664                            FLOAT(SHAREDBUFFREPOSITIONSERIALWRITEP);
54024666                            IF SHAREDBUFFREPOSITIONSERIALWRITE THEN
54024668                                BEGIN
54024670                                UNLOCK(SHAREDBUFFLOCK(UNITNUMBER));
54024672                                GO TO XIT;
54024674                                END;
54024676                            WHILE SHAREDBUFFWRITEOUTSTANDING_HDRX(
54024678                                    UNITNUMBER,IOAREA[BUFFPOOLINX]) DO
54024680                                BEGIN
54024682                                FLOAT(SHAREDBUFFWAITP);
54024684                                SHAREDBUFFWAIT(IOAREA,FALSE);
54024686                                END;
54024688                            END;
54024690                        END;
54024705                    END
54024710                    #,
```

MODIFYSHAREDBUFFPAUSE OF FIBSTACK OF <LOGICALIO> OF <SOFTIO>  ::  DEFINE  ::
        DECLARED @ 54024715    ENDS @ 54024775

```
54024715        MODIFYSHAREDBUFFPAUSE =
54024720                    BEGIN
54024725                    ASSERT(NOT SHAREDBUFFWRITEOUTSTANDING_HDRX(
54024730                            UNITNUMBER,IOAREA[BUFFPOOLINX]));
54024735                    IOAREA[IOSCOMPLETEDTARGET] :=
54024740                     SHAREDBUFFIOSCOMPLETED_HDRX(UNITNUMBER,
54024745                      IOAREA[BUFFPOOLINX])+1;
54024750                    IF APPEND THEN
54024755                        SHAREDBUFFLOCKHELD := TRUE
54024760                    ELSE
54024765                        UNLOCK(SHAREDBUFFLOCK(UNITNUMBER));
54024770                    END
54024775                    #,
```

MODIFYSHAREDBUFFRESUME OF FIBSTACK OF <LOGICALIO> OF <SOFTIO>   ::   DEFINE   ::
        DECLARED @ 54024780    ENDS @ 54024850

```
54024780        MODIFYSHAREDBUFFRESUME =
54024785                BEGIN
54024790                IF APPEND THEN
54024795                    SHAREDBUFFLOCKHELD := FALSE
54024800                ELSE BEGIN
54024805                    LOCK(SHAREDBUFFLOCK(UNITNUMBER));
54024810                    WHILE SHAREDBUFFWRITEOUTSTANDING_HDRX(
54024815                        UNITNUMBER,IOAREA[BUFFPOOLINX]) DO
54024820                        BEGIN
54024825                        FLOAT(SHAREDBUFFWAITP);
54024830                        SHAREDBUFFWAIT(IOAREA,FALSE);
54024835                        END;
54024840                    END;
54024845                END
54024850                #,
```

```
MODIFYSHAREDBUFFEPILOG OF FIBSTACK OF <LOGICALIO> OF <SOFTIO>   ::   DEFINE   ::
         DECLARED @ 54024855    ENDS @ 54024930

54024855          MODIFYSHAREDBUFFEPILOG(RECORDCOUNTEXTRA) =
54024860            BEGIN
54024865            IF RECORDCOUNT+(1+(RECORDCOUNTEXTRA)) GTR
54024870               SHAREDBUFFTOTALRECS_HDRX(UNITNUMBER) THEN
54024875              BEGIN
54024880                SHAREDBUFFTOTALRECS_HDRX(UNITNUMBER) :=
54024885                 RECORDCOUNT+(1+(RECORDCOUNTEXTRA));
54024890              END;
54024895            ASSERT(NOT SHAREDBUFFWRITEOUTSTANDING_HDRX(
54024900                       UNITNUMBER,IOAREA[BUFFPOOLINX]));
54024905            IOAREA[IOSCOMPLETEDTARGET] :=
54024910             SHAREDBUFFIOSCOMPLETED_HDRX(UNITNUMBER,
54024915              IOAREA[BUFFPOOLINX])+1;
54024920            UNLOCK(SHAREDBUFFLOCK(UNITNUMBER));
54024925            END
54024930            #,
```

```
CHECKSHAREDEOF OF FIBSTACK OF <LOGICALIO> OF <SOFTIO>  ::  DEFINE  ::
        DECLARED @ 53956350    ENDS @ 53957350

53956350        CHECKSHAREDEOF (RECORDCOUNTBIAS,NRECS,TRANSWORD) =
53956400                    BEGIN
53956450                    IF RECORDCOUNT+(RECORDCOUNTBIAS)+MAX(1,(NRECS)) GTR
53956500                        SHAREDBUFFTOTALRECS_HDRX(UNITNUMBER) THEN
53956550                      BEGIN
53956600                      IF (NRECS) LEQ 1 COR
53956650                         (RECORDCOUNT+(RECORDCOUNTBIAS)+1 GTR
53956700                            SHAREDBUFFTOTALRECS_HDRX(UNITNUMBER)) THEN
53956750                        BEGIN
53956800                        RSLT := LIOLRDEOFV;
53956850                        GO XIT;
53956900                        END;
53956950                      RSLT := LIOLRDSHORTBLOCKV;
53957000                      SYZE := (SHAREDBUFFTOTALRECS_HDRX(UNITNUMBER)-
53957050                              (RECORDCOUNT+(RECORDCOUNTBIAS)))*
53957100                              MAXRECSZ;
53957150                      IF (TRANSWORD) THEN
53957200                          SYZE := (SYZE*T) DIV I;
53957250                      END;
53957300                    END
53957350                    #,
```

```
SHAREDBUFFSYNCDSKEOFP OF FIBSTACK OF <LOGICALIO> OF <SOFTIO>  :: BOOLEAN PROCEDURE
     @ (1,A5)  ::  DECLARED @ 54889720    ENDS @ 54890364    FORWARD @ 54215100

54889720    BOOLEAN PROCEDURE SHAREDBUFFSYNCDSKEOFP;
54889725    BEGIN
54889730         ARRAY REFERENCE POOL[0];
54889735         REAL            INX,
54889740                         TRY,
54889745                         BOUND,
54889750                         HEADERTOTALRECS,
54889755                         FRAMES,
54889756                         CHUNKS,
54889760                         SECTORS,
54889765                         BITS;
54889770         BOOLEAN         RETRY,
54889775                         LOCKEDFILEHEADER,
54889780                         WRITEHEADER;
54889785
54889790         % INVARIENT              INVARIENT            INVARIENT
54889795         %
54889800         % When SHAREDBUFFOPTIMIZEDSCRUB is true, DSKEOF must NEVER
54889805         % be moved into or beyond a sector in an allocated row which
54889810         % has not been SUCCESSFULLY written or scrubbed since the
54889815         % row was allocated.  (Unallocated rows below DSKEOF are OK
54889820         % even if we have buffers pointing to them because they will
54889825         % be scrubbed on allocation, and scrub failure will prevent
54889830         % row allocation and will cause write errors if the buffers
54889835         % do get written.}
54889840         %
54889845         % SHAREDBUFFMUSTBEWRITTEN and SHAREDBUFFSCRUBFAILED are
54889850         % used solely to preserve this invarient.
54889855
54889860         LOCKSHAREDBUFFERPOOL;
54889865         POOL:=SHAREDBUFFPOOL[UNITNUMBER,*];
54889870         RETRY:=SHAREDBUFFOPTIMIZEDSCRUB(POOL);
54889875         TRY:=1;
54889880         BOUND:=MAXINT;
54889885         WHILE RETRY DO
54889890         BEGIN
54889895             RETRY:=FALSE;
54889900             INX:=SHAREDBUFFMAXINX(POOL);
54889905             DO
54889910             BEGIN
54889915                 IF SHAREDBUFFMUSTBEWRITTEN(POOL,INX) THEN
54889920                 BEGIN
54889925                     IF TRY GTR 1 THEN
54889930                     BEGIN
54889935                         BOUND:=MIN(BOUND,SHAREDBUFFFILEADDRESS(POOL,INX));
54889940                     END ELSE
54889945                     IF SHAREDBUFFWRITEOUTSTANDING(POOL,INX) THEN
54889950                     BEGIN
54889955                         IF NOT HAPPENED(SHAREDBUFFEVENT(POOL,INX)) THEN
54889960                         BEGIN
54889965                             UNLOCKSHAREDBUFFERPOOL;
54889970                             IF HDUMACHINE THEN
54889975                                 IOINPROCESS(SHAREDBUFFIOCB(POOL,INX));
54889980                             WAIT(SHAREDBUFFEVENT(POOL,INX));
54889985                             LOCKSHAREDBUFFERPOOL;
54889990                             RETRY:=TRUE;
54889995                         END;
54890000                         IF HAPPENED(SHAREDBUFFEVENT(POOL,INX)) CAND
54890005                            SHAREDBUFFWRITEOUTSTANDING(POOL,INX) THEN
54890010                         BEGIN
54890015                             % Just finished a write.
54890020                             SHAREDWRITEEPILOG(POOL,INX);
54890025                         END;
54890035                     END ELSE
54890040                     BEGIN
54890045                         SCRUBUNDERBUFFER(POOL,INX,FALSE);
```

```
54890050                END;
54890055            END;
54890060            INX:=*-1;
54890065        END UNTIL INX LSS 0;
54890070        TRY:=TRY+1;
54890075    END;
54890080    BOUND:=MIN(BOUND,SHAREDBUFFCURRENTFILEBOUND(POOL));
54890085    IF StreamWFS THEN
54890090    BEGIN
54890095        DEFINE BOUNDFRAMES =
54890100            ((BOUND DIV ROWSIZE(DHEADER))*EXTFRAMES_PER_AREA+
54890105             (BOUND MOD ROWSIZE(DHEADER))*EXTFRAMES_PER_SECTOR) #;
54890110
54890115        HEADERTOTALRECS:=MIN(SHAREDBUFFTOTALRECS(POOL),
54890120                             BOUNDFRAMES DIV MAXRECSZ);
54890125        FRAMES:=HEADERTOTALRECS*MAXRECSZ;
54890126        CHUNKS:=MAX(0,FRAMES-1) DIV EXTFRAMES_PER_AREA;
54890130        BITS:=EXTFRAMES_TO_BITS(FRAMES-(CHUNKS*EXTFRAMES_PER_AREA));
54890135        SECTORS:=CHUNKS*ROWSIZE(DHEADER)+
54890140                 (BITS DIV BITS_PER_SECTOR);
54890145        BITS:=BITS MOD BITS_PER_SECTOR;
54890150    END ELSE
54890155    BEGIN
54890160        DEFINE BOUNDRECS =
54890165            ((BOUND DIV SEGPERBLK)*RECPERBLK+
54890170             (((BOUND MOD SEGPERBLK)*EXTFRAMES_PER_SECTOR) DIV
54890175               MAXRECSZ                                   )) #;
54890180
54890185        HEADERTOTALRECS:=MIN(SHAREDBUFFTOTALRECS(POOL),BOUNDRECS);
54890186        CHUNKS:=MAX(0,HEADERTOTALRECS-1) DIV RECPERBLK;
54890190        BITS:=EXTFRAMES_TO_BITS((HEADERTOTALRECS-(CHUNKS*RECPERBLK))*
54890195                                 MAXRECSZ);
54890200        SECTORS:=CHUNKS*SEGPERBLK+
54890205                 (BITS DIV BITS_PER_SECTOR);
54890210        BITS:=BITS MOD BITS_PER_SECTOR;
54890215    END;
54890220    IF HEADERTOTALRECS GTR SHAREDBUFFHEADERTOTALRECS(POOL) THEN
54890225    BEGIN
54890230        IF PERMANENT(DHEADER) OR
54890235           OPENCOUNTCI(UNITNUMBER) GTR 1 THEN
54890240        BEGIN
54890245           ACQUIREFILEHEADER(UNITNUMBER);
54890250           LOCKEDFILEHEADER:=TRUE;
54890255        END;
54890260        IF SECTORS GTR DSKEOFV(DHEADER) OR
54890265           (SECTORS EQL DSKEOFV(DHEADER) AND
54890270            BITS GTR DSKEOFU(DHEADER)        ) THEN
54890275        BEGIN
54890280           SETDSKEOFV(DHEADER,SECTORS);
54890285           SETDSKEOFU(DHEADER,BITS);
54890290        END;
54890292        % Else a previous RELEASEHEADER issued by us failed, or
54890294        % some stack not using the shared buffer pool extended
54890296        % DSKEOF.  In the second case, the stack not using the
54890298        % shared buffer pool probably invoked RELEASEHEADER, but we
54890300        % don't know whether that RELEASEHEADER succeeded (or even
54890302        % if it has completed yet... the other stack probably gave
54890304        % up the disk file header lock between the DSKEOF update
54890306        % and the RELEASEHEADER invocation).  Therefore, we will
54890308        % do our own REALEASEHEADER for permanent files before
54890310        % reporting success to our invoker.
54890312        IF PERMANENT(DHEADER) THEN
54890314        BEGIN
54890316            WRITEHEADER:=TRUE;
54890318        END ELSE
54890320        BEGIN
54890322            SHAREDBUFFHEADERTOTALRECS(POOL):=HEADERTOTALRECS;
54890324        END;
54890326        IF LOCKEDFILEHEADER THEN
```

```
54890328              UNLOCKFILEHEADER(UNITNUMBER);
54890330          IF WRITEHEADER THEN
54890332          BEGIN
54890334              IF RELEASEHEADER(DHEADER,
54890336                          0 & 1 UPDATEDF & 1 STILLINUSEF) LSS 0 THEN
54890338              BEGIN
54890340                  % FLAG ERR SO FIBCLOSE CAN CATCH LATER
54890342                  LOCKEDSETHEADERCHANGED(DHEADER,TRUE);
54890344                  SHAREDBUFFSYNCDSKEOFP:=TRUE;
54890346              END ELSE
54890348              BEGIN
54890350                  SHAREDBUFFHEADERTOTALRECS(POOL):=HEADERTOTALRECS;
54890352              END;
54890354          END;
54890356      END;
54890358      IF SHAREDBUFFSCRUBFAILED(POOL) THEN
54890360          SHAREDBUFFSYNCDSKEOFP:=TRUE;
54890362      UNLOCKSHAREDBUFFERPOOL;
54890364  END SHAREDBUFFSYNCDSKEOFP;
```

ADJUSTSHAREDPOOLP OF FIBSTACK OF <LOGICALIO> OF <SOFTIO>  ::  PROCEDURE @ (1,30F)  ::
        DECLARED @ 54890485    ENDS @ 54891235

```
54890485        PROCEDURE ADJUSTSHAREDPOOLP(NBUFFS);
54890490        VALUE NBUFFS;
54890495        REAL   NBUFFS;
54890500        BEGIN
54890505            ARRAY REFERENCE POOL[0];
54890510            REAL              INX;
54890515
54890520            DEFINE DEALLOCATEBUFF =
54890525            BEGIN
54890530                ASSERT(SHAREDBUFFUSERS(POOL,INX) EQL 0 AND
54890535                       NOT SHAREDBUFFMUSTBEWRITTEN(POOL,INX) AND
54890540                       NOT SHAREDBUFFWRITEOUTSTANDING(POOL,INX) AND
54890545                       NOT (SHAREDBUFFASSIGNED(POOL,INX) AND
54890550                            SHAREDBUFFIOSCOMPLETED(POOL,INX) EQL 0));
54890555                IF SHAREDBUFFALLOCATED(POOL,INX) THEN
54890560                BEGIN
54890565                    SUMBUFFSTATS(SHAREDBUFFBGCATEGORY(POOL),
54890570                                 LENGTHOF(SHAREDBUFFBUFFER(POOL,INX)),
54890575                                 -1);
54890580                    AMNESIA(SHAREDBUFFBUFFER[POOL,INX],FALSE);
54890585                    SHAREDBUFFALLOCATED(POOL,INX):=FALSE;
54890590                    ASSERT(SHAREDBUFFALLOCATEDBUFFERS(POOL) GTR 0);
54890595                    SHAREDBUFFALLOCATEDBUFFERS(POOL):=*-1;
54890600                END;
54890605                IF SHAREDBUFFIOCBALLOCATED(POOL,INX) THEN
54890610                BEGIN
54890615                    FORGETIOCB(SHAREDBUFFIOCB(POOL,INX));
54890620                    SHAREDBUFFIOCBALLOCATED(POOL,INX):=FALSE;
54890625                END;
54890630                SHAREDBUFFASSIGNED(POOL,INX):=FALSE;
54890635            END #;
54890640
54890645            LOCK(SHAREDBUFFLOCK(UNITNUMBER));
54890650            IF NOT PRESENT(SHAREDBUFFPOOL[UNITNUMBER,*]) THEN
54890655            BEGIN
54890660                ASSERT(NBUFFS GTR 0);
54890662                ALLOCATE_MCP_ARRAY(
54890664                    WORD AT SHAREDBUFFPOOL[UNITNUMBER,*],
54890666                    SAVEARRAYPROFILE(
54890668                        SHAREDBUFFPOOLWORDS(NBUFFS+SHAREDBUFFPOOLEXTRABUFFS))
54890670                        & DOPEOREVENTAREA AREATYPEF
54890672                        & OLAY_AND_WAIT    SEARCHCONTROLF,
54890674                    MCPSTACK);
54890680                POOL:=SHAREDBUFFPOOL[UNITNUMBER,*];
54890685                SHAREDBUFFMAXINX(POOL):=NBUFFS+SHAREDBUFFPOOLEXTRABUFFS-1;
54890690                POOL:=SHAREDBUFFPOOL[UNITNUMBER,*];
54890695                SHAREDBUFFALLOWEDBUFFERS(POOL):=NBUFFS;
54890700                SHAREDBUFFCLIENTFIBS(POOL):=1;
54890705                IF StreamWFS THEN
54890710                BEGIN
54890715                    DEFINE FULLROWSFRAMES =
54890720                        ((DSKEOFV(DHEADER) DIV ROWSIZE(DHEADER))*
54890725                         EXTFRAMES_PER_AREA) #;
54890730                    DEFINE LASTROWBITS =
54890735                        ((DSKEOFV(DHEADER) MOD ROWSIZE(DHEADER))*
54890740                         BITS_PER_SECTOR+
54890745                         DSKEOFU(DHEADER)) #;
54890750
54890755                    SHAREDBUFFHEADERTOTALRECS(POOL):=
54890760                        (FULLROWSFRAMES+(LASTROWBITS DIV BITS_PER_EXTFRAME)) DIV
54890765                        MAXRECSZ;
54890770                END ELSE
54890775                BEGIN
54890780                    DEFINE FULLBLOCKSRECORDS =
54890785                        ((DSKEOFV(DHEADER) DIV SEGPERBLK)*RECPERBLK) #;
54890790                    DEFINE LASTBLOCKBITS =
```

```
54890795              ((DSKEOFV(DHEADER) MOD SEGPERBLK)*BITS_PER_SECTOR+
54890800               DSKEOFU(DHEADER)) #;
54890805
54890810          SHAREDBUFFHEADERTOTALRECS(POOL):=
54890815            FULLBLOCKSRECORDS+
54890820            (LASTBLOCKBITS DIV (BITS_PER_EXTFRAME*MAXRECSZ));
54890825        END;
54890830        SHAREDBUFFTOTALRECS(POOL):=SHAREDBUFFHEADERTOTALRECS(POOL);
54890835        SHAREDBUFFCURRENTFILEBOUND(POOL):=
54890840          DSKEOFV(DHEADER)+REAL(DSKEOFU(DHEADER) GTR 0);
54890845        SHAREDBUFFULTIMATEFILEBOUND(POOL):=
54890850          IF CRUNCHED(DHEADER)
54890855            THEN SHAREDBUFFCURRENTFILEBOUND(POOL)
54890860            ELSE (ROWSIZE(DHEADER)*MAXNUMBEROFROWSV);
54890865        SHAREDBUFFMAXSECTORS(POOL):=RequestedSectorsInBuffer;
54890870        SHAREDBUFFBGCATEGORY(POOL):=
54890875          IF WORKINGFILESTRUCTURE = ALIGNED180FS
54890880            THEN BGNOTAPPLICABLE
54890885            ELSE IF REQUESTED_BUFFERSIZE(FAB) = 0
54890890                   THEN BGUSED
54890895                   ELSE BGOVERRIDDEN;
54890900        IF SECDISKSCRUB OR
54890905          CLEARAREAS(DHEADER) THEN
54890910        BEGIN
54890915          IF DELAYSCRUB THEN
54890920          BEGIN
54890925              SHAREDBUFFOPTIMIZEDSCRUB(POOL):=TRUE;
54890930          END ELSE
54890935          BEGIN
54890940              SHAREDBUFFFULLSCRUB(POOL):=TRUE;
54890945          END;
54890950        END ELSE
54890952        IF NOT DONTCLEARAREAS THEN
54890955        BEGIN
54890960            SHAREDBUFFOPTIMIZEDSCRUB(POOL):=TRUE;
54890965        END;
54890970    END ELSE
54890975    IF NBUFFS GTR 0 THEN
54890980    BEGIN
54890985        POOL:=SHAREDBUFFPOOL[UNITNUMBER,*];
54890990        NBUFFS:=*+SHAREDBUFFALLOWEDBUFFERS(POOL);
54890995        IF SIZE(SHAREDBUFFPOOL[UNITNUMBER,*]) LSS
54891000           SHAREDBUFFPOOLWORDS(NBUFFS) THEN
54891005        BEGIN
54891010            EXPANDAROW(SHAREDBUFFPOOL[UNITNUMBER,*],
54891015              SHAREDBUFFPOOLWORDS(NBUFFS+SHAREDBUFFPOOLEXTRABUFFS),0);
54891020            SHAREDBUFFMAXINX(POOL):=NBUFFS+SHAREDBUFFPOOLEXTRABUFFS-1;
54891025        END;
54891030        SHAREDBUFFALLOWEDBUFFERS(POOL):=NBUFFS;
54891035        SHAREDBUFFCLIENTFIBS(POOL):=*+1;
54891040        RequestedSectorsInBuffer:=SHAREDBUFFMAXSECTORS(POOL);
54891045        ALLOCATED_BUFFERSIZE(FAB):=
54891050          RequestedSectorsInBuffer*WORDS_PER_SECTOR;
54891055    END ELSE
54891060    BEGIN
54891065        ASSERT(NBUFFS LSS 0);
54891070        NBUFFS:=ABS(NBUFFS);
54891075        POOL:=SHAREDBUFFPOOL[UNITNUMBER,*];
54891080        ASSERT(SHAREDBUFFALLOWEDBUFFERS(POOL) GEQ NBUFFS);
54891085        SHAREDBUFFALLOWEDBUFFERS(POOL):=*-NBUFFS;
54891090        ASSERT(SHAREDBUFFCLIENTFIBS(POOL) GTR 0);
54891095        SHAREDBUFFCLIENTFIBS(POOL):=*-1;
54891100        IF SHAREDBUFFCLIENTFIBS(POOL) EQL 0 THEN
54891105        BEGIN
54891110            INX:=SHAREDBUFFMAXINX(POOL);
54891115            DO
54891120            BEGIN
54891125                DEALLOCATEBUFF;
54891130                INX:=-1;
```

```
54891135              END UNTIL INX LSS 0;
54891140              AMNESIA(SHAREDBUFFPOOL[UNITNUMBER,*],FALSE);
54891145           END ELSE
54891150           BEGIN
54891155              INX:=SHAREDBUFFLEFTOFF(POOL);
54891160              WHILE SHAREDBUFFALLOCATEDBUFFERS(POOL) GTR
54891165                     (SHAREDBUFFALLOWEDBUFFERS(POOL)+
54891170                      SHAREDBUFFPOOLEXTRABUFFS          ) DO
54891175              BEGIN
54891180                 IF SHAREDBUFFALLOCATED(POOL,INX) CAND
54891185                    SHAREDBUFFUSERS(POOL,INX) EQL 0 THEN
54891190                       DEALLOCATEBUFF;
54891195                 INX:=*-1;
54891200                 IF INX LSS 0 THEN
54891205                    INX:=SHAREDBUFFMAXINX(POOL);
54891210                 ASSERT(INX NEQ SHAREDBUFFLEFTOFF(POOL));
54891215              END;
54891220           END;
54891225        END;
54891230        UNLOCK(SHAREDBUFFLOCK(UNITNUMBER));
54891235     END ADJUSTSHAREDPOOLP;
```

Some of the many advantages of the present invention should now be readily apparent. For example, in error reporting, when data written via a given logical file fails to be successfully written to the physical disk media 16, or fails to become part of the file due to failure to successfully write the physical file's disk file header 20 (containing an increased end-of-file value) to the physical disk media 16, an error is reported to that logical file (and then to the client or user of that logical file). Also, physical writes are minimized; if several logical files modify the data in a given buffer before any requests that the buffer be written, then only one physical write need be performed.

Overlap of buffer modification and physical write is prevented. While a physical write is in process for a given buffer, all modifications to that buffer are blocked. Thus, those logical file write operations which do not span buffer boundaries will appear indivisibly (all or none) on the physical disk media 16 after a system 10 interruption.

More than one logical file can be linked to a single shared buffer as long as the shared buffer contain any changes intended for physical media 16 from the logical files that have not yet been written from such shared buffer to that media. In other words, no link from a logical file to a shared buffer is removed until the physical write to physical media required by that logical buffer is accomplished. In other words, the linkage between a logical file and a shared buffer is not broken if that logical file has done a write to that buffer and that write has not yet been forced out to the desired location in the physical media. Furthermore, where two such logical files have accomplished such a write to the same shared buffer that has not yet been forced out to physical media, the respective links between that shared buffer and those two (or more) logical files not only are maintained until the data from those logical files has been forced out from the shared buffer to the media, but furthermore this is accomplished using a single physical write operation to the media. When a logical file has finished providing its data to a shared buffer, instead of issuing a physical write, it instead invokes a procedure called INITIATESHAREDWRITEP which decides whether a write from the buffer to physical media needs to be issued. This procedure is invoked by the program 22, 24, etc. for that logical file when it is done with that shared buffer and a physical write would normally be issued. Procedure INITIATESHAREDWRITEP coordinates decisions about writes among all of the logical files.

The first step is to make sure that the user of a—logical file calls routine INITIATESHAREDWRITEP before giving up its connection to a buffer which that logical file has written to. That logical file is the only logical file that would remember or keep a record that it had written to that shared buffer. Alternatively, if a logical file did not remember or keep a record of that information, then a list could have been added off to the side which remembers which logical files had modified a particular buffer. Now, instead of requiring a logical file to finish all physical writes from a buffer to media, instead before a logical file severs its link to a shared buffer that it has written to, it calls routine INITIATESHAREDWRITEP. That routine will report to that logical file all errors (if any) that relate to the data from that logical file to be so written. Thus, all such errors are reported to the logical file before the link is broken.

If routine INITIATESHAREDWRITEP just did the physical write from the shared buffer to the physical media rather than looking to see whether it needed to do that write, all errors related to that data would still be reported back to the appropriate logical file when they need to be. Thus, any errors in writing something to media in this case would get back to the user to inform that user that the data did not get so physically written. For example, if the value 5 is to be written to a certain slot on the file, and that 5 never gets forced out to the physical media, then the logical file providing that 5 should be informed of that error. If routine INTIATESHAREDWRITEP just did a write whether it was necessary or not, and waited for that write synchronously and informed the user software program of the result, then it would be thereby ensured that no user's data did not get written out to physical media without that user finding out about that problem.

However, as written, routine INITIATESHAREDWRITEP not only avoids forcing a user to wait for the physical write to be accomplished, but furthermore that routine is not forced to always wait for the end of the physical I/O to occur in cases where the user is going to use another buffer and can leave sit the buffer which that user has just issued the write on and find out about it later. Also, where two or more logical files have changed the same shared buffer, a separate physical I/O step is not needed for each such user. For example, if ten logical files have accessed or changed the same shared buffer, then it is obviously advantagous to do a single physical input/output step instead of ten. Furthermore, overlapping is avoided. For example, if one program wrote to some place within a shared buffer and another program wrote to a different place in that same shared buffer, then after those writes have been accomplished, both programs can decide that they are done with that buffer and call routine INITIATESHAREDWRITEP. As discussed above, routine INITIATESHAREDWRITEP accomplishes the physical write for each of the two users using one I/O from that shared buffer to the physical media. Where two programs have both made changes to a single shared buffer, and both programs therefore think that that single shared buffer needs to be written to physical media, in practice the content of that buffer only needs to be written to physical media once because one write would push out both such changes. A single shared buffer would only write to one area of the physical media. For example, a shared buffer may have a size of 2000 bytes, and one program may have changed byte 7 and another program may have changed byte 43. A single write would put both changes out to the appropriate location in physical media at one time, especially since it is already determined from the particular bytes modified and the area of physical media which that buffer would operate on. In such a situation, two physical I/Os for the two changes would be redundant. For that reason, the structure of FIG. 1 includes a mechanism that would track which locations in physical media have to be written to, and that would coordinate the write operation. This is accomplished by two-dimensional shared buffer pool array 38 (particularly in that it includes the buffer information containers of shared buffer pool rows 42, etc.), two-dimensional header index array 44, and logical file dope vectors 54, 60, etc. Each row 42 contains a number of variables for each shared buffer; FIG. 1 shows a separate column of row 42 for each shared buffer 26–34 of pool 36. One place in row 42 shows where the buffer pool 36 believes the end of file is. For each shared buffer 26–34, there is a variable in row 42 called SHAREDBUFFIOSCOMPLETED. Variable SHAREDBUFFIOSCOMPLETED is an integer counter, and in each row 42, the entry for each shared buffer has a SHAREDBUFFIOSCOMPLETED counter associated with it. Each column of row 42 is a dope vector, one for each shared buffer. Each such dope vector has a set of words, some of which are descriptors and some of which are integers. Each logical file dope vector 54, 60, etc. has a buffer information container called IOSCOMPLETEDTARGET. Variable SHAREDBUFFIOSCOMPLETED and variable IOSCOMPLETEDTARGET together ensure that each user program is informed of any errors in performing physical writes it has requested to physical media, while ensuring that only one physical write is required for each shared buffer no matter how many programs have written to that buffer. Of these functions, the former is associated with the copy descriptor of row 42, and the other is associated with the MOM descriptor. Each variable SHAREDBUFFIOSCOMPLETED is associated with a single shared buffer while each variable IOSCOMPLETEDTARGET is associated with a program's use of that buffer. For any one buffer, if variable SHAREDBUFFIOSCOMPLETED has a value of zero in it, then the data in that buffer is not yet valid; in other words, a read must still be performed to fill or provide that buffer with the desired data. If variable SHAREDBUFFIOSCOMPLETED has a value of zero, that identifies a buffer which points to a place in the physical media which is already allocated but for which the data has not yet been read from the physical file into the buffer. Before that read can be accomplished, if the user wants to write a byte into a particular location in the physical file, and if the shared buffer is for example 2000 bytes long, that buffer cannot simply be filled with zeros except for the one byte to be so written, because then the value of the other 1999 bytes would be thereby erased. There are two ways in which a buffer could be filled: for accomplishing a read from physical media or by issuing a write to that buffer with data to be provided to physical media. However, if the location in the shared buffer to be so modified corresponds to a location beyond the end of file for the physical media, then that data value is simply zeroed and is not read. If routine ALLOCATESHAREDBUFFERP is asked to find a buffer, and such a buffer is not already available so that a new buffer has to be allocated for space that is beyond the present end of file, then that routine ALLOCATESHAREDBUFFERP simply zeros the value of that data rather than doing a read. However, if that space is within the file (is not beyond the current end of file), then the requested read has to be performed within a currently valid location. Thus, when variable SHAREDBUFFIOSCOMPLETED has a value of one, that value indicates that the data in the corresponding shared buffer is valid, which means that either a read to that buffer has been accomplished or the value of that buffer has been zeroed depending on whether the media storage space represented by that buffer is within or beyond the current end of file and has never been written. A value of two or more for variable SHAREDBUFFIOSCOMPLETED means that the data in that shared buffer is valid. A value of two for that variable means that shared buffer has been written to physical media once. A value of three for variable SHAREDBUFFIOSCOMPLETED means that the data in the corresponding shared buffer is valid, and that that buffer has been written twice. Another variable stored in row 42 is variable SHAREDBUFFWRITEOUTSTANDING; a value of false for that variable means that there is no write outstanding, while a value of true indicates that a physical write to the media has been issued but completion of that write has not yet been processed. If that variable SHAREDBUFFWRITEOUTSTANDING has a value of true, then the corresponding physical write may have been finished, but the data that the I/O processor has put into memory has not been checked to see whether it finished that write successfully or not; the result of that write has not been checked and so completion of that write has not yet been processed. Thus, if the value of variable SHAREDBUFFIOSCOMPLETED is one, then either the corresponding buffer has never been written to, or else a write from that buffer to physical media has been issued but whose completion has not yet been processed. The value of variable SHAREDBUFFIOSCOMPLETED has a maximum that is conceptually unboundedly large. The value of variable IOSCOMPLETEDTARGET at any given moment is meaningful only if a logical file has modified the corresponding shared buffer. So, at the point where that logical file asks to be hooked to that buffer and this variable is still zero, at the point where this logical file changes a byte (for example, byte 17) in that buffer, a value is then stored in that variable IOSMPLETEDTARGET recording that that byte of the shared buffer has been changed. The value of variable IOSCOMPLETEDTARGET is therefore set to the value of variable SHAREDBUFFIOSCOMPLETED plus one. If the value of variable SHAREDBUFFIOSCOMPLETED is two, then variable IOSCOMPLETEDTARGET has a value of three. This records that until the value of variable SHAREDBUFFIOSCOMPLETED goes to three, the data that has been written to the corresponding shared buffer has not yet been physically written from that buffer to the appropriate location in disk media 16 or the like.

When the program(s) 22, 24, etc. have finished writing data from logical file(s) 50, 56, etc. to a particular shared buffer (such as buffer 30), and have finished doing so, then routine INITIATESHAREDWRITEP is called. In that routine, the value of variable IOSCOMPLETEDTARGET in buffer information container (BIC) set 54, 60, etc. is compared with the current value of variable SHAREDBUFFIOSCOMPLETED held in the column associated with that shared buffer of the appropriate row of array 38 associated with a particular location (e.g. 97) of the logical file 50, 56, etc. being written to that buffer. When that comparison is made, if the value of variable SHAREDBUFFIOSCOMPLETED is greater than or equal to the value of variable IOSCOMPLETEDTARGET, that indicates that the write to physical media 16 has been successfully done since that shared buffer was modified by the program. If so, then nothing further need be done with regard to that write, and normal processing by the programs in memory 12 can continue; a new write is not needed. Although this comparison indicates whether the physical write has been accomplished, it is necessary to check variable SHAREDBUFFLRD to see if that write has been done successfully. The value of variable SHAREDBUFFLRD is the result of the last I/O that has been done. The value of variable SHAREDBUFFLRD is then checked to determine whether that write was successful.

When routine INITIATESHAREDWRITEP is called, it is first determined whether there is a need to do a physical I/O operation. This is determined by checking whether a write has been done since the shared buffer has last been modified and if that write was successful. If both of those things are true, then there is no need to do a further write and routine INITIATESHAREDWRITEP can be exited. So, if the value of variable SHAREDBUFFIOSCOMPLETED is greater than or equal to the value of variable IOSCOMPLETEDTARGET, then it is known that a write command has been issued. A write command can be issued because another program other than that (or those) modifying that shared buffer has issued a write, or it could happen because it has been incorrectly attempted to twice write from the shared buffer so modified.

For APPEND extensions, APPEND writes must be atomic with respect to each other. A program must be able to issue an APPEND write without using any locking protocols and be able to rely on the file space used being disjoint from that used by any other concurrent APPEND writes issued by other programs. This is accomplished by the present invention.

The entire shared buffer pool 36 need not be serialized. By holding the shared buffer pool's lock over the entire span of an APPEND write, but giving it up when switching buffers on a non-APPEND write, atomicity of APPEND writes is ensured while permitting concurrency for non-APPEND writes. In this regard, it may be necessary to issue and wait for physical I/O's when buffers are switched or exchanged.

Furthermore, reads are protected from seeing invalid file space. To ensure atomicity of APPEND writes which cross buffer boundaries, the value or location of the end-of-file can be incremented before transferring data to the buffers. That way, if control is lost while switching buffers, any other APPEND write which occurs while control is lost will not overlap. Unfortunately, if control is lost while switching buffers, any read operation which occurs while control is lost will see an end-of-file spanning file space which is not valid. In the present invention, this problem is avoided by postponing the end-of-file update until the entire APPEND data transfer completes, so that reads are protected from seeing invalid file space.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. In a data processing system in which access to a physical file is shared among a plurality of users, a method of minimizing physical write operations, comprising the steps of:

(a) initializing one of a plurality of buffers that comprise a shared buffer pool with data from the physical file;

(b) controlling users' write requests to the physical file from said one of said plurality of buffers that comprise said shared buffer pool, such that the plurality of users share substantially simultaneous write access to the physical file copied in said one of said plurality of buffers, and wherein a single write operation from said one of said plurality of buffers to the physical file is performed after writes by at least one of the plurality of users to said one of said plurality of buffers;

(c) reporting status information to the users who had written to said one of said plurality of buffers when a write operation of the contents of said one of said plurality of buffers to the physical file fails.

2. The method as recited in claim 1, wherein the buffers that comprise the shared buffer pool are stored in main memory.

3. The method as recited in claim 1, wherein the physical file is stored on a disk drive.

4. The method as recited in claim 1, wherein the step of controlling data transfer requests further comprises the steps of:

(i) establishing a link between each one of said plurality of users when said each one of said plurality of users has written data to said buffer which is destined for the physical file;

(ii) maintaining said link between said each one of said plurality of users while said each one of said plurality of users has data remaining in said buffer that is destined to be written to the physical file but has not yet been written to the physical file; and, (iii) releasing said link between each one of said plurality of users when the user has no data remaining in said buffer which is destined for the physical file.

5. The method as recited in claim 4, wherein step (i), comprises the steps of:

(A) searching the plurality of buffers comprising the buffer pool for said one of said plurality of buffers that contains data from the physical file;

(B) returning a pointer of said address of said one of said plurality of buffers that contains data from the physical file, such that said each one of said plurality of users can access the data in the physical file through the data contained in said one of said plurality of buffers; and, (C) returning a pointer of status information associated with said one of said plurality of buffers which contains data from the physical file, such that writes to said one of said plurality of buffers that have not been written to the physical file are indicated.

6. The method as recited in claim 4, wherein step (ii) comprises updating said status information when at least one of said plurality of users requests that said one of said plurality of buffers that contains data from the physical file be written to the physical file.

7. The method as recited in claim 4, wherein the step (iii) comprises setting said pointer to a value representing a released link when said one of said plurality of buffers that contains data from the physical file is successfully written to the physical file.

8. The method as recited in claim 4, wherein there is a private memory area for each user and step (i) comprises using pointers from each user's private memory area to a memory area accessible to said plurality of users.

9. In a system for shared access to a storage media having a physical file, a method for coordinating writes to the physical file from at least a first and a second user comprising the steps of:

(a) receiving a write request from the first user to write to a first portion of the physical file;

(b) moving the physical file to one of a plurality of buffers that comprise a shared buffer pool;

(c) establishing a link between the first user and said one of the plurality of buffers such that requests for writing to said first portion of the physical file operate upon said one of said plurality of buffers;

(d) receiving another write request from the second user to write to a second portion of the physical file;

(e) establishing a second link between the second user and said one of the plurality of buffers that contains the physical file such that requests for writing to said second portion of the physical file operate upon said one of said plurality of buffers;

(f) controlling the write requests from the first user and the second user to the physical file such that the first user and the second user share access to the physical file through said one of said plurality of buffers, such that writes to the physical file are minimized;

(g) reporting to the first user errors resulting from writes from said one of said plurality of buffers to the physical file while said first user has written data to said one of said plurality of buffers that has not been written to the physical file; and, (h) reporting to the second user errors resulting from writes from said one of said plurality of buffers to the physical file while said second user has written data to said one of said plurality of buffers that has not been written to the physical file.

10. The method as recited in claim 9, wherein the buffers comprising the shared buffer pool are stored in main memory.

11. The method as recited in claim 9, wherein the physical file is stored on a disk drive.

12. The method as recited in claim 9, wherein the step of establishing a link from the first user comprises using pointers from a private memory area of the user to a shared memory area.

13. The method as recited in claim 9, wherein the step of establishing a link from the second users comprises using pointers from a private memory area of the user to a shared memory area.

* * * * *